US012770577B2

(12) United States Patent
Kim et al.

(10) Patent No.: US 12,770,577 B2
(45) Date of Patent: Oct. 20, 2026

(54) DISPLAY APPARATUS INCLUDING NARROW BEZEL

(71) Applicant: LG Display Co., Ltd., Seoul (KR)

(72) Inventors: Eui Tae Kim, Paju-si (KR); Hong Sik Kim, Paju-si (KR); Ye Seul Han, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 19/314,252

(22) Filed: Aug. 29, 2025

(65) Prior Publication Data

US 2026/0188245 A1 Jul. 2, 2026

(30) Foreign Application Priority Data

Dec. 31, 2024 (KR) ........................ 10-2024-0202867

(51) Int. Cl.
*G09G 3/3266* (2016.01)

(52) U.S. Cl.
CPC ... *G09G 3/3266* (2013.01); *G09G 2300/0426* (2013.01); *G09G 2300/0871* (2013.01); *G09G 2310/08* (2013.01); *G09G 2320/0223* (2013.01); *G09G 2330/021* (2013.01)

(58) Field of Classification Search
CPC ......... G09G 3/3266; G09G 2300/0426; G09G 2300/0871; G09G 2310/08; G09G 2320/0223; G09G 2330/021
See application file for complete search history.

(56) References Cited

U.S. PATENT DOCUMENTS 6,380,918 B1 * 4/2002 Chiba ................. G02F 1/13452 345/90
2015/0293546 A1 * 10/2015 Tanaka .............. G02F 1/133308 327/541
2017/0098413 A1 * 4/2017 Lee ....................... G09G 3/3233
2021/0118370 A1 * 4/2021 Shim ..................... G09G 3/3233
2022/0406250 A1 * 12/2022 Lee ....................... G09G 3/3225
2023/0290309 A1 * 9/2023 Yu ......................... G09G 3/3233

FOREIGN PATENT DOCUMENTS

KR 10-2015-0079645 A 7/2015
KR 10-2021-0045169 A 4/2021
KR 10-2024-0098843 A 6/2024

* cited by examiner

*Primary Examiner* — Amit Chatly
(74) *Attorney, Agent, or Firm* — Fenwick & West LLP

(57) ABSTRACT

A display apparatus including narrow bezel is provided. The display apparatus includes a first emission driver set in a first display area of a display panel and configured to output an emission signal, needed for pixel driving, to emission signal supply lines, a second emission driver set in a second display area of the display panel and configured to output the emission signal to a emission signal supply lines, first emission clock lines connected to the first emission driver set in the first display area, second emission clock lines connected to the second emission driver set in the second display area, first division lines configured to supply a first emission clock and a second emission clock having different phases to the first emission clock lines, and a second division lines configured to supply the first emission clock and the second emission clock to the second emission clock lines.

16 Claims, 20 Drawing Sheets

DISPLAY APPARATUS INCLUDING NARROW BEZEL

CROSS-REFERENCE TO RELATED APPLICATION

This application claims the benefit of the Republic of Korea Patent Application No. 10-2024-0202867 filed on Dec. 31, 2024, which is hereby incorporated by reference in its entirety.

TECHNICAL FIELD

The present disclosure relates to a display apparatus.

BACKGROUND ART

In display apparatuses, the demand for a narrow bezel where a width of a non-display area is narrow is increasing. To implement a narrow bezel, a gate driver in active area (GIA) type where gate drivers are distributed and disposed in a display area has been known.

However, in a conventional GIA type, a resistor-capacitor (RC) delay of a gate clock increases due to an overlap capacitance which occurs in a number of gate driver sets and clock lines connected thereto. When an RC load of a gate clock increases, a gate output may be distorted.

Such a problem severely occurs in a large screen display apparatus.

SUMMARY

To overcome the aforementioned problem of the related art, the present disclosure may provide a display apparatus which may reduce the distortion of a gate output occurring in gate driver sets distributed and disposed in a display area.

To achieve these objects and other advantages and in accordance with the purpose of the disclosure, as embodied and broadly described herein, a display apparatus includes: a first emission driver set disposed in a first display area of a display panel and configured to output an emission signal, needed for pixel driving, to a plurality of emission signal supply lines; a second emission driver set disposed in a second display area of the display panel and configured to output the emission signal to a plurality of emission signal supply lines; a plurality of first emission clock lines connected to the first emission driver set in the first display area; a plurality of second emission clock lines connected to the second emission driver set in the second display area; a plurality of first division lines configured to supply a first emission clock and a second emission clock having different phases to the plurality of first emission clock lines; and a plurality of second division lines configured to supply the first emission clock and the second emission clock to the plurality of second emission clock lines.

In another embodiment of the present disclosure, a display apparatus includes: an emission driver group disposed in a first display area of a display panel and configured to output an emission signal, needed for pixel driving, to a plurality of emission signal supply lines; a first scan driver group disposed in a second display area adjacent to the first display area in the display panel and configured to output a first scan signal, needed for pixel driving, to a plurality of first scan signal supply lines; a second scan driver group disposed in a third display area adjacent to the second display area in the display panel and configured to output a second scan signal, needed for pixel driving, to a plurality of second scan signal supply lines; a plurality of emission clock link lines configured to supply a plurality of emission clocks to a plurality of emission clock lines connected to the emission driver group; a plurality of first scan clock bus lines configured to supply a plurality of first scan clocks to a plurality of first scan clock lines connected to the first scan driver group; and a plurality of second scan clock bus lines configured to supply a plurality of second scan clocks to a plurality of second scan clock lines connected to the second scan driver group, wherein the plurality of emission clock link lines, the plurality of first scan clock bus lines, and the plurality of second scan clock bus lines do not overlap each other.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION

Figure 1:
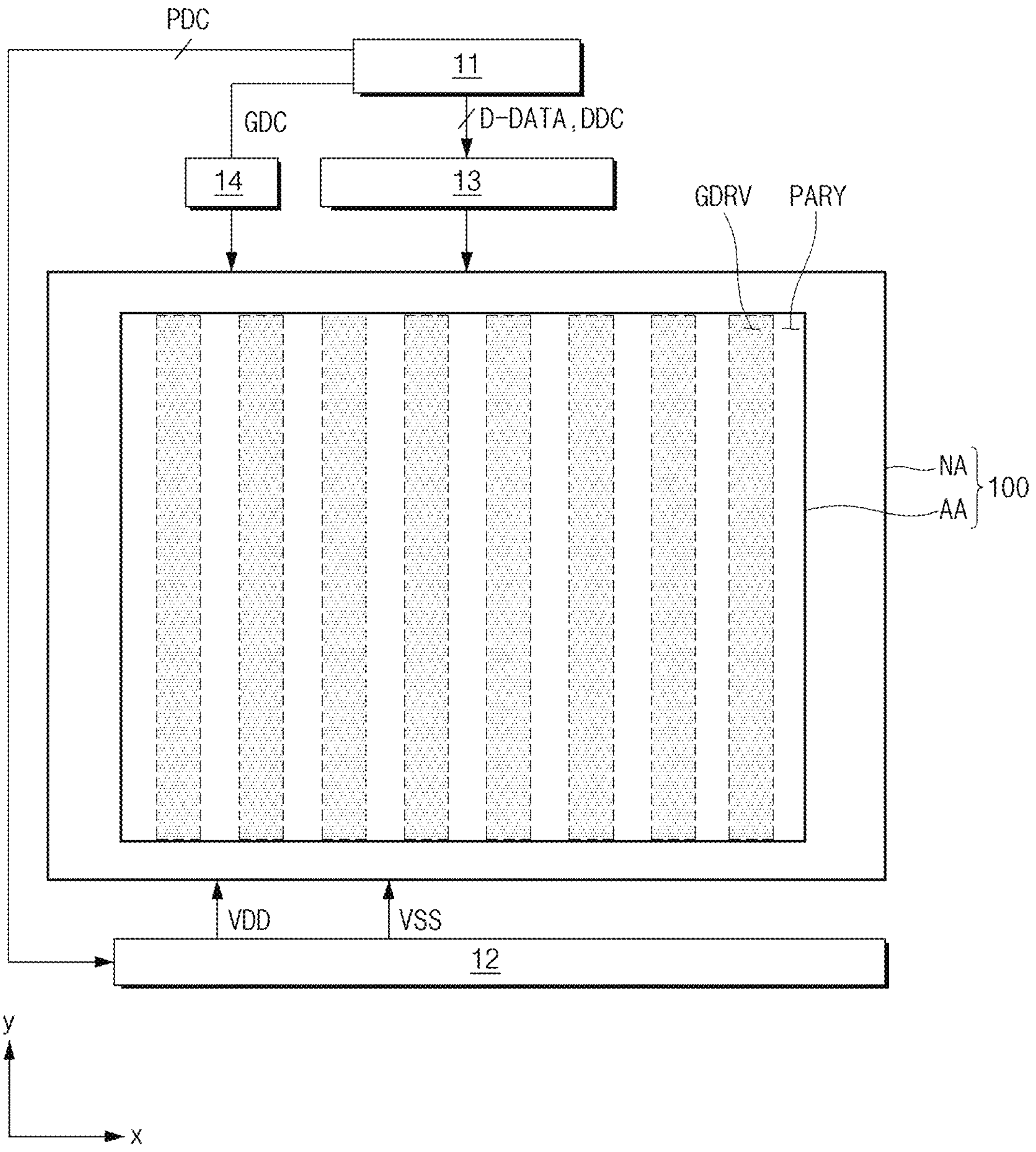
FIG. 1 is a block diagram illustrating a display apparatus according to an embodiment of the present disclosure.

Hereinafter, exemplary embodiments of the present disclosure will be described in detail with reference to the accompanying drawings. In the specification, in adding reference numerals for elements in each drawing, it should be noted that like reference numerals already used to denote like elements in other drawings are used for elements wherever possible. In the following description, when the detailed description of the relevant known function or configuration is determined to unnecessarily obscure the important point of the present disclosure, the detailed description will be omitted.

Like reference numerals refer to like elements. Also, a thickness, a ratio, and a dimension of each element described herein are illustrated to be partially enlarged or reduced for convenience of effective description. A scale of each element illustrated in the drawings of the present disclosure may have a scale which differs from a real scale, for convenience of description, but is not limited to a scale illustrated in the drawings.

In the present disclosure, when an arbitrary element (or a region, a layer, a portion, etc.) is described as "being on", "connected", or "coupled", this may denote that the arbitrary element may be directly connected/coupled to another element, or a third element may be disposed therebetween.

The term "and/or" may include all of one or more combinations capable of being defined by relevant elements.

Terms like a first and a second may be used to describe various elements, but the elements should not be limited by the terms. The terms may be used only as object for distinguishing an element from another element. For example, without departing from the spirit and scope of the inventive concept, a first element may be referred to as a second element, and similarly, the second element may be referred to as the first element. The terms of a singular form may include plural forms unless referred to the contrary.

The terms "under", "below", "on", and "above" may be used to describe a correlation between elements illustrated in the drawings. The terms may be a relative concept and may be described with respect to a direction illustrated in the drawings. For example, unless "just" or "direct" is used, one or more other elements between two elements may be disposed. Spatially relative terms "below", "beneath", "lower", "above", and "upper" may be used herein for easily describing a relationship between one device or elements and other devices or elements as illustrated in the drawings. Therefore, for example, "under" and "lower" may be opposite to "on" and "upper" with respect to a first element.

It should be understood that spatially relative terms are terms including different orientations of elements in use or operation, in addition to the orientation illustrated in the drawings. For example, if a device in the drawings is turned over, elements described as being on the "below" or "beneath" sides of other elements may be placed on "above" sides of the other elements. Therefore, the exemplary term "lower" may include both orientations of "lower" and "upper". Likewise, the exemplary term "above" or "upper" may include both orientations of above and below.

It should be understood that the meaning of "include," "comprise," "including," or "comprising," specifies a property, a region, a fixed number, a step, a process, an element and/or a component, but does not exclude other properties, regions, fixed numbers, steps, processes, elements and/or components.

Features of various embodiments of the present disclosure may be partially or overall coupled to or combined with each other and may be variously inter-operated with each other and driven technically as those skilled in the art can sufficiently understand. The embodiments of the present disclosure may be carried out independently from each other or may be carried out together in co-dependent relationship.

Figure 2:
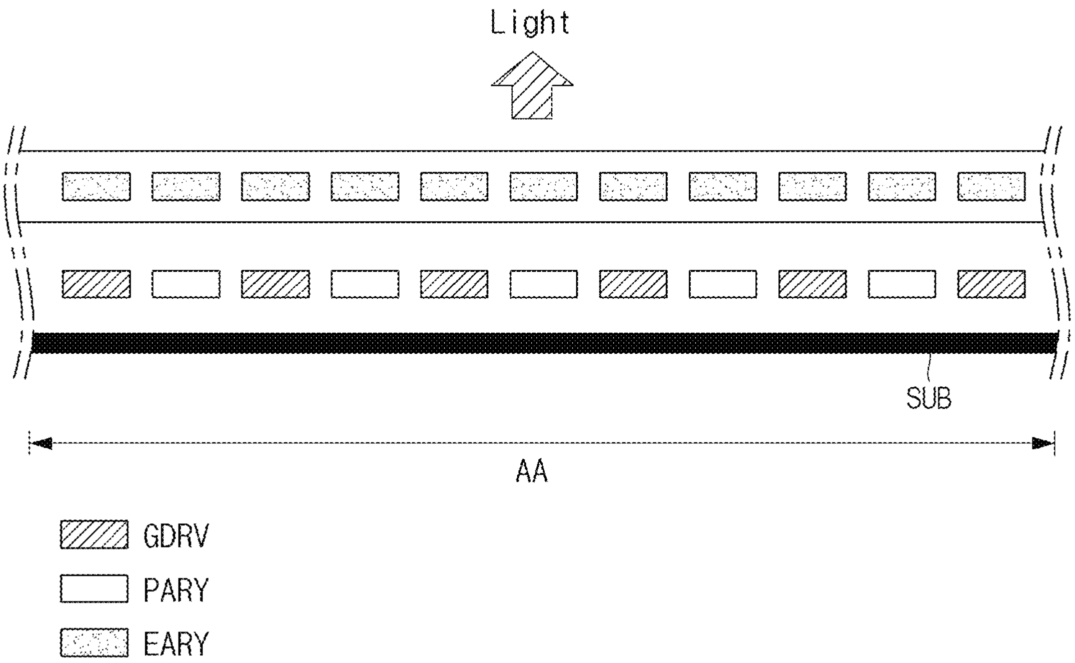
FIG. 2 is a schematic cross-sectional view of a display area of a display panel according to an embodiment of the present disclosure.

FIG. 1 is a block diagram illustrating a display apparatus according to an embodiment of the present disclosure. FIG. 2 is a schematic cross-sectional view of a display area of a display panel according to an embodiment of the present disclosure.

As illustrated in FIG. 1, the display apparatus according to an embodiment of the present disclosure may include a display panel 100, a timing controller 11, a power circuit 12, a data driver 13, a plurality of gate driver sets GDRV, and a level shifter 14.

The display panel 100 may include a display area (active area) AA and a non-display area (non-active area) NA. The non-display area NA may be disposed along an edge of the display panel 100, and the non-display area NA may be disposed outside the display area AA in the display panel 100.

The display area AA may display an image corresponding to image data D-DATA and the non-display area NA may include a bezel region, which does not display an image, of the display panel 100.

As illustrated in FIG. 2, a plurality of pixel circuits PARY and a plurality of gate driver sets GDRV may be alternately arranged in the display area AA. In the display area AA, the pixel circuits PARY and the gate driver sets GDRV may be disposed under an emission array EARY and may at least partially overlap the emission array EARY. The emission array EARY may be implemented with a plurality of light emitting devices OLED. Light emitted from each of the light emitting devices OLED may be irradiated upward from a substrate SUB. One pixel may be implemented by a combination of one pixel circuit PARY and one light emitting device OLED. A plurality of pixels may be provided as a matrix type to configure a pixel array, in the display area AA.

The plurality of pixel circuits PARY and the plurality of gate driver sets GDRV may be alternately arranged in a first direction x (for example, a horizontal direction), and the gate driver sets GDRV may be arranged between the pixel circuits PARY. Each of the plurality of pixel circuits PARY and the plurality of gate driver sets GDRV may extend in a second direction y (for example, a vertical direction) intersecting the first direction x.

In the display area AA, a plurality of data lines extending in the first direction x may intersect a plurality of gate lines extending in the second direction y in the display area AA, and the pixel circuit PARY may be disposed in each of areas defined by intersections between the plurality of data lines and the plurality of gate lines. Each pixel circuit PARY may be connected to one data line and three gate lines. The three gate lines may include a first scan signal supply line, a second scan signal supply line, and an emission signal supply line.

In the display area AA, pixels adjacent to each other in the first direction x may configure a pixel row, and pixels adjacent to each other in the second direction y may configure a pixel column. A plurality of pixel rows and a plurality of pixel columns may be provided in the display area AA.

A plurality of pixels may be grouped to configure one unit pixel. The one unit pixel may be for implementing various colors. When a pixel group for color implementation is defined as a unit pixel, one unit pixel may be configured to include a red (R) pixel, a green (G) pixel, and a blue (B) pixel, but is not limited thereto and may be configured to include a red (R) pixel, a green (G) pixel, a blue (B), and a white (W) pixel.

The light emitting device OLED may include an anode electrode, a cathode electrode, and an organic compound layer formed therebetween. The organic compound layer may include a hole injection layer (HIL), a hole transport layer (HTL), an emission layer (EML), an electron transport layer (ETL), and an electron injection layer (EIL), but is not limited thereto. When a pixel current flows in the light emitting device OLED, a hole passing through the hole transport layer (HTL) and an electron passing through the electron transport layer (ETL) may move to the emission layer (EML) to generate an exciton, and thus, the emission layer (EML) may emit visible light. Also, the organic compound layer may be replaced with an inorganic compound layer.

A thin film transistor included in the pixel circuit PARY may be implemented to include low temperature polysilicon (LTPS) or oxide.

The timing controller 11 may supply digital image data D-DATA, transferred from a host system, to the data driver 13. The timing controller 11 may receive a timing signal such as a vertical synchronization signal, a horizontal synchronization signal, a data enable signal, and a dot clock from the host system to generate timing control signals for controlling operation timings of the data driver 13, the gate driver sets GDRV, and the power circuit 12.

The timing controller 11 may generate a gate timing control signal GDC for controlling the operation timings of the gate driver sets GDRV, a data timing control signal DDC for controlling the operation timing of the data driver 13, and a power timing control signal for controlling the operation timing of the power circuit 12.

The host system may be an application processor (AP) applied to mobile devices, wearable devices, and virtual/augmented reality (VR/AR) devices. Also, the host system may be a main board of television systems, set-top box, navigation systems, personal computers, and home theater systems, but is not limited thereto.

The data driver 13 may be connected to the plurality of pixels through the plurality of data lines. The data driver 13 may generate analog data voltages needed for driving of the pixels and may respectively supply the analog data voltages to the data lines.

The data driver 13 may sample and latch the digital image data D-DATA input from the timing controller 11 to generate parallel data, based on the data timing control signal DDC, a digital-to-analog converter (DAC) thereof may map the digital image data D-DATA to gamma compensation voltages to generate data voltages, and the data driver 13 may respectively supply the data voltages to the pixels through the data lines. The data voltages may be analog voltages corresponding to image gray levels which are to be expressed in the pixels.

The data driver 13 may include a plurality of source driver integrated circuits (ICs). Each of the source driver ICs may include a shift register, a latch, the DAC, and an output buffer.

The gate driver sets GDRV may include a plurality of emission driver sets, a plurality of first scan driver sets, and a plurality of second scan driver sets.

The plurality of emission driver sets may be connected to the plurality of pixels through a plurality of emission signal supply lines. The plurality of emission driver sets may generate an emission signal needed for driving of the pixels and may supply the emission signal to the emission signal supply lines. The plurality of emission driver sets may be multiply connected to a plurality of positions of the emission signal supply line, and thus, a delay deviation of the emission signal based on a position may be reduced.

The plurality of first scan driver sets may be connected to a plurality of pixels through a plurality of first scan signal supply lines. The plurality of first scan driver sets may generate a first scan signal needed for driving of the pixels and may supply the first scan signal to the first scan signal supply lines. The plurality of first scan driver sets may be multiply connected to a plurality of positions of the first scan signal supply line, and thus, a delay deviation of the first scan signal based on a position may be reduced.

The plurality of second scan driver sets may be connected to a plurality of pixels through a plurality of second scan signal supply lines. The plurality of second scan driver sets may generate a second scan signal needed for driving of the pixels and may supply the second scan signal to the second scan signal supply lines. The plurality of second scan driver sets may be multiply connected to a plurality of positions of the second scan signal supply line, and thus, a delay deviation of the second scan signal based on a position may be reduced.

The level shifter 14 may be supplied with the gate timing control signal GDC from the timing controller 11 to convert a logic voltage level of the gate timing control signal GDC into a turn-on voltage level and a turn-off voltage level and may supply a level-converted gate timing control signal GDC to the gate driver sets GDRV. The gate timing control signal GDC may include emission clocks, first scan clocks, and second scan clocks.

The level shifter 14 may supply the emission clocks to the plurality of emission driver sets through emission clock lines disposed in the display area AA. The level shifter 14 may supply the first scan clocks to the plurality of first scan driver sets through first scan clock lines disposed in the display area AA. The level shifter 14 may supply the second scan clocks to the plurality of second scan driver sets through second scan clock lines disposed in the display area AA.

The emission clocks, the first scan clocks, and the second scan clocks may swing between a turn-on voltage and a turn-off voltage. The turn-on voltage may be set to a voltage which is greater than a threshold voltage of a transistor included in each of the gate driver sets GDRV, and the turn-off voltage may be set to a voltage which is less than the threshold voltage of the transistor. When the transistor included in each of the gate driver sets GDRV is a PMOS transistor, the turn-on voltage may be a gate low voltage VGL, and the turn-off voltage may be a gate high voltage VGH.

The power circuit 12 may increase or decrease an input power to generate a high-level pixel voltage VDD and a low-level pixel voltage VSS, based on the power timing control signal, and may supply the high-level pixel voltage VDD or the low-level pixel voltage VSS to the plurality of pixel circuits PARY and the plurality of gate driver sets GDRV.

Figure 3A:
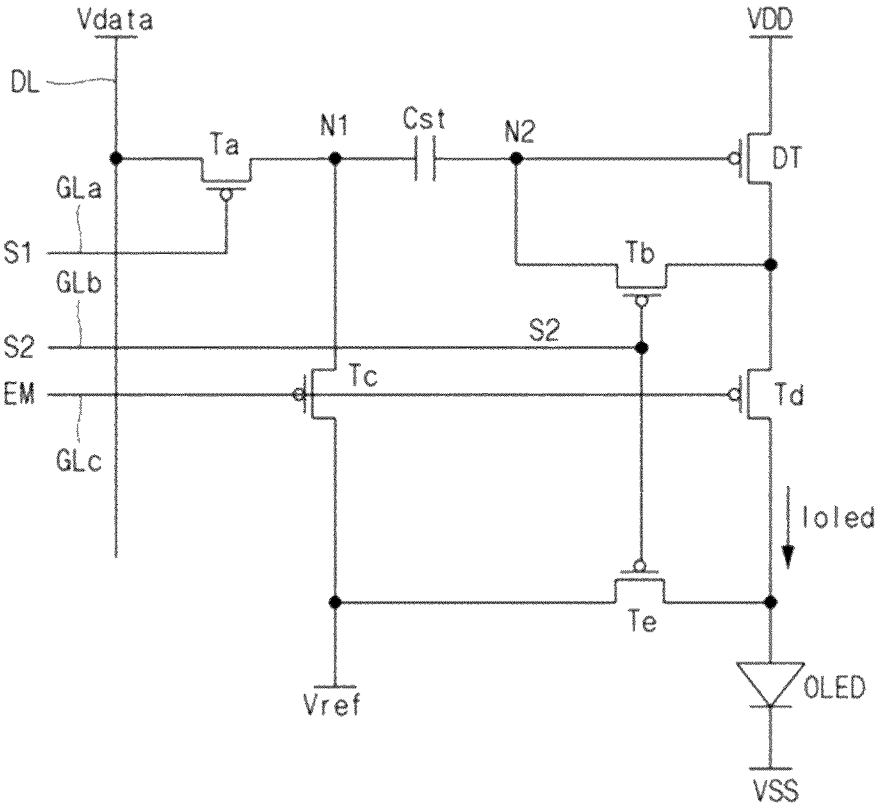
FIGS. 3A and 3B respectively illustrate a pixel circuit and a driving timing thereof according to an embodiment of the present disclosure.
Figure 3B:
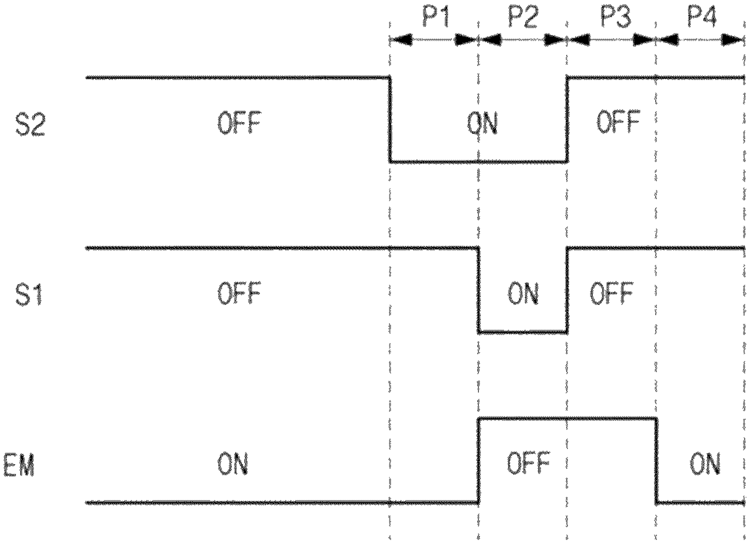

FIGS. 3A and 3B respectively illustrate a pixel circuit and a driving timing thereof according to an embodiment of the present disclosure.

As illustrated in FIG. 3A, a pixel circuit according to an embodiment of the present disclosure may include Ta, Tb, Tc, Td, and Te transistors, a storage capacitor Cst, and a driving transistor DT and may be connected to a light emitting device OLED.

The Ta transistor may include a gate electrode receiving a first scan signal S1 through a first scan line GLa, a first electrode receiving a data voltage Vdata through a data line DL, and a second electrode connected to a first node N1. The Ta transistor may transfer the data voltage Vdata to the first node N1 in response to the first scan signal S1 of a turn-on level.

The storage capacitor Cst may be connected between the first node N1 and a second node N2 and may store a difference voltage between a voltage of the first node N1 and a voltage of the second node N2.

The driving transistor DT may include a gate electrode connected to the second node N2, a first electrode receiving a high-level driving voltage VDD, and a second electrode electrically connected to the light emitting device OLED. The driving transistor DT may be supplied with the high-level driving voltage VDD to generate a driving current corresponding to the voltage of the second node N2. A magnitude of the driving current may be differently generated based on the voltage of the second node N2.

The Tb transistor may include a gate electrode receiving a second scan signal S2 through a second scan line GLb, a first electrode connected to the second electrode of the driving transistor DT, and a second electrode connected to the second node N2. The Tb transistor may electrically connect the second electrode of the driving transistor DT to the second node N2 in response to the second scan signal S2 of a turn-on level. That is, while the Tb transistor is being turned on, the second electrode and the gate electrode of the driving transistor DT may be short-circuited therebetween, and thus, the driving transistor DT may operate like a diode.

The Tc transistor may include a gate electrode receiving an emission signal EM through an emission signal supply line GLc, a first electrode receiving a reference voltage Vref, and a second electrode connected to the first node N1. The Tc transistor may supply the reference voltage Vref to the first node N1 to initialize the first node N1, in response to the emission signal EM of a turn-on level.

The Td transistor may include a gate electrode receiving the emission signal EM, a first electrode connected to the driving transistor DT, and a second electrode connected to the light emitting device OLED. The Td transistor may supply the driving current, generated by the driving transistor DT, to the light emitting device OLED in response to the emission signal EM of a turn-on level.

The Te transistor may include a gate electrode receiving the second scan signal S2, a first electrode receiving the reference voltage Vref, and a second electrode connected to the anode electrode of the light emitting device OLED. The Te transistor may supply the reference voltage Vref to the anode electrode of the light emitting device OLED to initialize the anode electrode of the light emitting device OLED, in response to the second scan signal S2 of a turn-on level.

As illustrated in FIG. 3B, an operation sequence of the pixel circuit may include an initialization period P1, a programming period P2, a holding period P3, and an emission period P4.

In the initialization period P1, the second scan signal S2 and the emission signal EM may be input at a turn-on level, and the first node N1, the second node N2, and the anode electrode of the light emitting device OLED may be supplied with the reference voltage Vref and may thus be initialized.

In the programming period P2, a threshold voltage Vth of the driving transistor DT may be sampled, and the data voltage Vdata may be programmed in the second node N2. In detail, in the programming period P2, the first scan signal S1 and the second scan signal S2 may be input at a turn-on level, and thus, the data voltage Vdata may be supplied to the first node N1, and a voltage obtained by summating a driving voltage VDD and the threshold voltage Vth of the driving transistor DT may be supplied to the second node N2 and may be stored in the storage capacitor Cst.

In the holding period P3, the first and second scan signals S1 and S2 and the emission signal EM may be input at a turn-off level, and thus, the first and second nodes N1 and N2 connected to the storage capacitor Cst may be floated.

In the emission period P4, the emission signal EM may be input at a turn-on level, and thus, the driving transistor DT may generate the driving current to supply the driving current to the light emitting device OLED, based on a voltage level of the second node N2 connected to the storage capacitor Cst.

Figure 4:
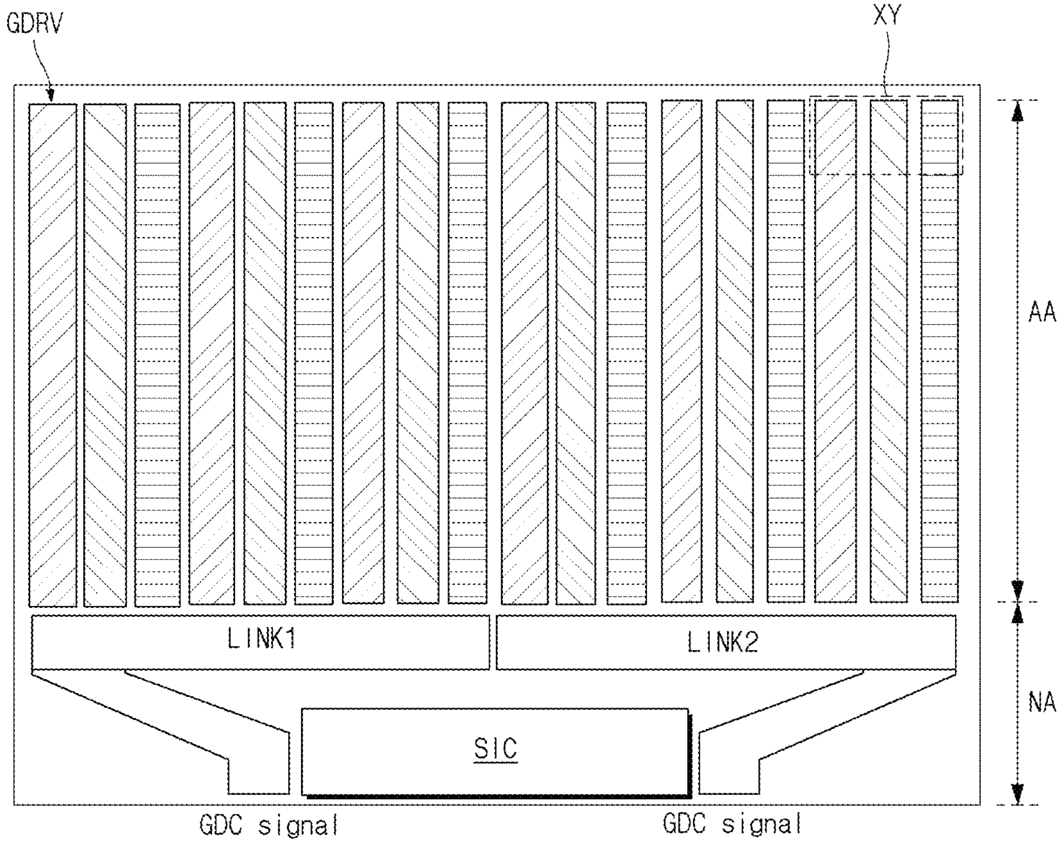
FIG. 4 is a diagram illustrating an arrangement example of gate driver sets based on a gate driver in active area (GIA) type according to an embodiment of the present disclosure.
Figure 5:
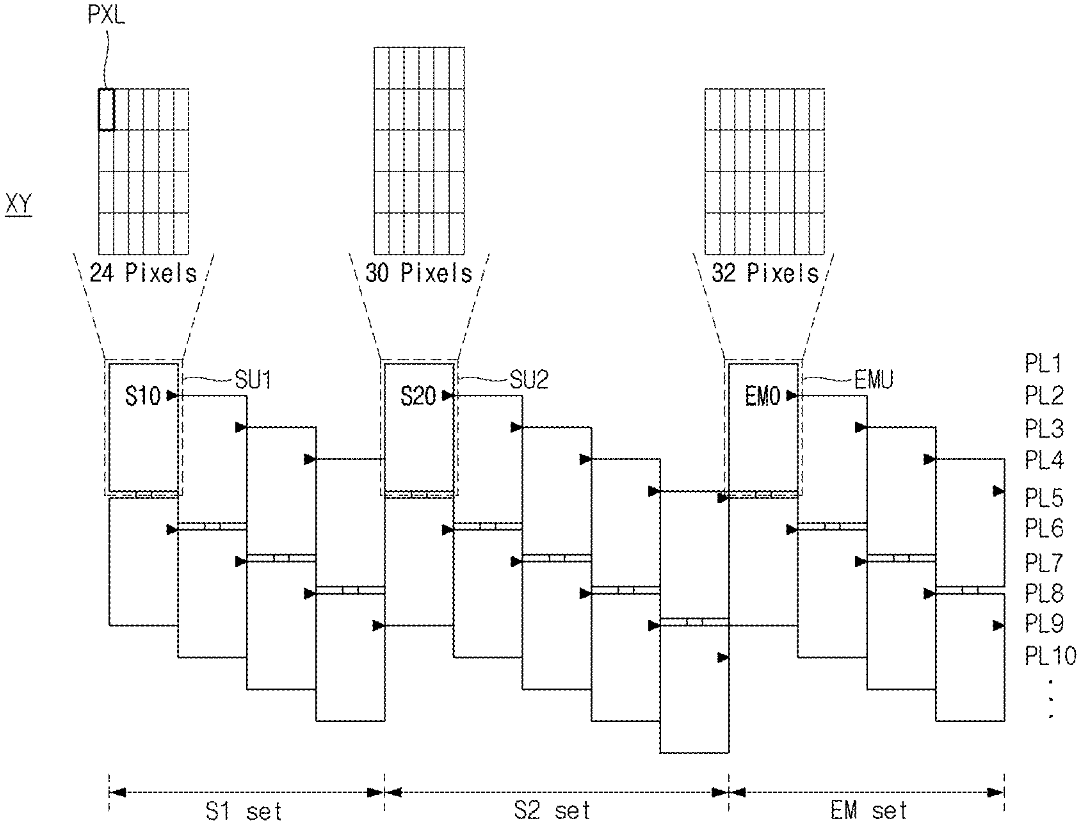
FIG. 5 is an enlarged view of a region XY of FIG. 4 according to an embodiment of the present disclosure.

FIG. 4 is a diagram illustrating an arrangement example of gate driver sets based on a gate driver in active area (GIA) type according to an embodiment of the present disclosure. FIG. 5 is an enlarged view of a region XY of FIG. 4 according to an embodiment of the present disclosure.

Referring to FIGS. 4 and 5, a plurality of gate driver sets GDRV may be distributed and disposed in a display area. The gate driver sets GDRV may include a plurality of first scan driver sets (hereinafter referred to as an S1 set), a plurality of second scan driver sets (hereinafter referred to as an S2 set), and a plurality of emission driver sets (hereinafter referred to as an EM set).

The S1 set may supply a first scan signal S1, where a phase thereof is sequentially shifted, to first scan signal supply lines of the display area. To this end, the S1 set may include first scan units SU1 equal to the number of first scan signal supply lines. Outputs S1O of the first scan units SU1 may be connected to the first scan signal supply lines. Each of the first scan units SU1 may include a plurality of circuit blocks. For example, circuit blocks configuring the first scan unit SU1 may be distributed and disposed in a pixel area of 6 pixels*4 pixels (i.e., 24 pixels) size, but is not limited thereto.

The S2 set may supply a second scan signal S2, where a phase thereof is sequentially shifted, to second scan signal supply lines of the display area. To this end, the S2 set may include second scan units SU2 equal to the number of second scan signal supply lines. Outputs S2O of the second scan units SU2 may be connected to the second scan signal supply lines. Each of the second scan units SU2 may include a plurality of circuit blocks. For example, circuit blocks configuring the second scan unit SU2 may be distributed and disposed in a pixel area of 6 pixels*5 pixels (i.e., 30 pixels) size, but is not limited thereto.

The EM set may supply an emission signal EM, where a phase thereof is sequentially shifted, to emission signal supply lines of the display area. To this end, the EM set may include emission units EMU equal to the number of emission signal supply lines. Outputs EMO of the emission units EMU may be connected to the emission signal supply lines. Each of the emission units EMU may include a plurality of circuit blocks. Circuit blocks configuring the emission unit EMU may be distributed and disposed in a pixel area of 8 pixels*4 pixels (i.e., 32 pixels) size, but is not limited thereto.

In the display area, a plurality of S1 sets may be distributed and disposed, a plurality of S2 sets may be distributed and disposed, and a plurality of EM sets may be distributed and disposed. For example, the S1 sets, the S2 sets, and the EM sets may be repeatedly arranged in a set sequence of S1-S2-EM from the left of the display area. Gate driver sets GDRV of a first group may be disposed in a left display area managed by one source driver IC SIC, and gate driver sets GDRV of a second group may be disposed in a right display area.

The gate driver sets GDRV of the first group may be supplied with a gate timing control signal GDC through first link lines LINK1 included in a lower non-display area, and the gate driver sets GDRV of the second group may be supplied with the gate timing control signal GDC through second link lines LINK2 included in the lower non-display area. Because the first link lines LINK1 and the second link lines LINK2 are isolated from each other, a delay of the gate timing control signal GDC may be reduced.

Furthermore, in FIG. 5, "PL1 to PL10" may be pixel rows.

Figure 6:
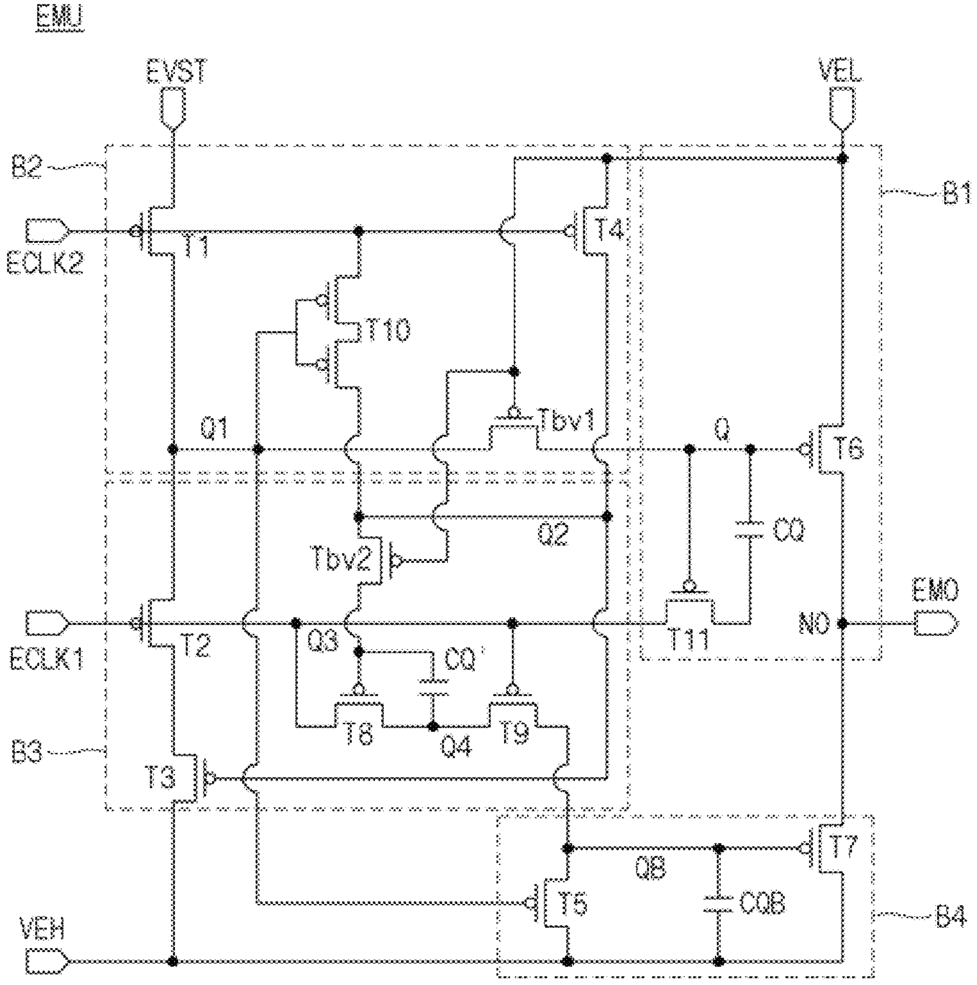
FIG. 6 is a diagram illustrating an example of an emission unit circuit included in an emission driver set according to an embodiment of the present disclosure.
Figure 7:
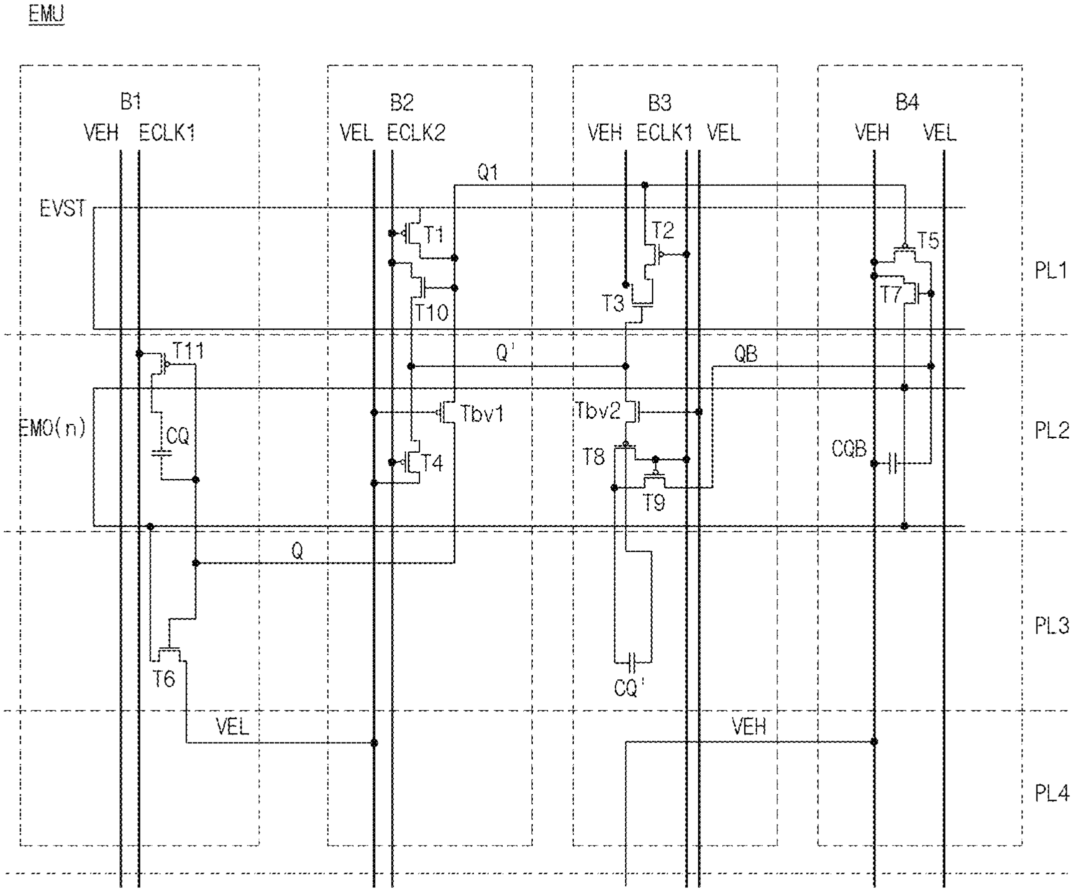
FIG. 7 is a diagram illustrating an example where emission unit circuits are distributed and disposed in four pixel rows included in a display area according to an embodiment of the present disclosure.

FIG. 6 is a diagram illustrating an example of an emission unit circuit included in an emission driver set according to an embodiment of the present disclosure. FIG. 7 is a diagram illustrating an example where emission unit circuits are distributed and disposed in four pixel rows included in a display area according to an embodiment of the present disclosure.

Referring to FIGS. 6 and 7, an emission unit EMU may be implemented as an edge trigger type. The emission unit EMU may be divided into a first block B1, a second block B2, a third block B3, and a fourth block B4. The emission unit EMU may be distributed and disposed in four pixel rows PL1 to PL4 included in a display area. The emission unit EMU may be distributed and disposed in a pixel area of 8 pixels*4 pixels (i.e., 32 pixels) size, in four pixel rows PL1 to PL4.

The first block B1 may include a T6 transistor, a CQ capacitor, and a T11 transistor.

A gate electrode of the T6 transistor may be connected to a Q node, a first electrode thereof may be connected to a low-level driving voltage VEL, and a second electrode thereof may be connected to an output node NO. A gate electrode of the T11 transistor may be connected to the Q node, a first electrode thereof may be connected to the CQ capacitor, and a second electrode thereof may be connected to an input terminal of a first emission clock ECLK1. The CQ capacitor may be connected to the Q node and the first electrode of the T11 transistor.

The second block B2 may include a T1 transistor, a T4 transistor, a T10 transistor, and a Tbv1 transistor.

A gate electrode of the T1 transistor may be connected to an input terminal of a second emission clock ECLK2, a first electrode thereof may be connected to a start signal EVST or a front-end output (a carry signal), and a second electrode thereof may be connected to a Q1 node. A gate electrode of the T4 transistor may be connected to the input terminal of the second emission clock ECLK2, a first electrode thereof may be connected to the low-level driving voltage VEL, and a second electrode thereof may be connected to a Q2 node. A gate electrode of the T10 transistor may be connected to the Q1 node, a first electrode thereof may be connected to the input terminal of the second emission clock ECLK2, and a second electrode thereof may be connected to the Q2 node. A gate electrode of the Tbv1 transistor may be connected to the low-level driving voltage VEL, a first electrode thereof may be connected to the Q node, and a second electrode thereof may be connected to the Q1 node.

The third block B3 may include a T2 transistor, a T3 transistor, a T8 transistor, a T9 transistor, a Tbv2 transistor, and a CQ' capacitor.

A gate electrode of the T2 transistor may be connected to the input terminal of the first emission clock ECLK1, a first electrode thereof may be connected to the Q1 node, and a second electrode thereof may be connected to a first electrode of the T3 transistor. A gate electrode of the T3 transistor may be connected to the Q2 node, the first electrode thereof may be connected to the second electrode of the T2 transistor, and a second electrode thereof may be connected to a high-level driving voltage VEH. A gate electrode of the T8 transistor may be connected to a Q3 node, a first electrode thereof may be connected to the input terminal of the first emission clock ECLK1, and a second electrode thereof may be connected to a Q4 node. A gate electrode of the T9 transistor may be connected to the input terminal of the first emission clock ECLK1, a first electrode thereof may be connected to a Q4 node, and a second electrode thereof may be connected to the high-level driving voltage VEH. A gate electrode of the Tbv2 transistor may be connected to the low-level driving voltage VEL, a first electrode thereof may be connected to the Q2 node, and a second electrode thereof may be connected to the Q3 node. The CQ' capacitor may be connected to the Q3 node and the Q4 node.

The fourth block B4 may include a T5 transistor, a T7 transistor, and a CQB capacitor.

A gate electrode of the T5 transistor may be connected to the Q1 node, a first electrode thereof may be connected to the QB node, and a second electrode thereof may be connected to the low-level driving voltage VEL. A gate electrode of the T7 transistor may be connected to the QB node, a first electrode thereof may be connected to the output node NO, and a second electrode thereof may be connected to the high-level driving voltage VEH.

Figure 8:
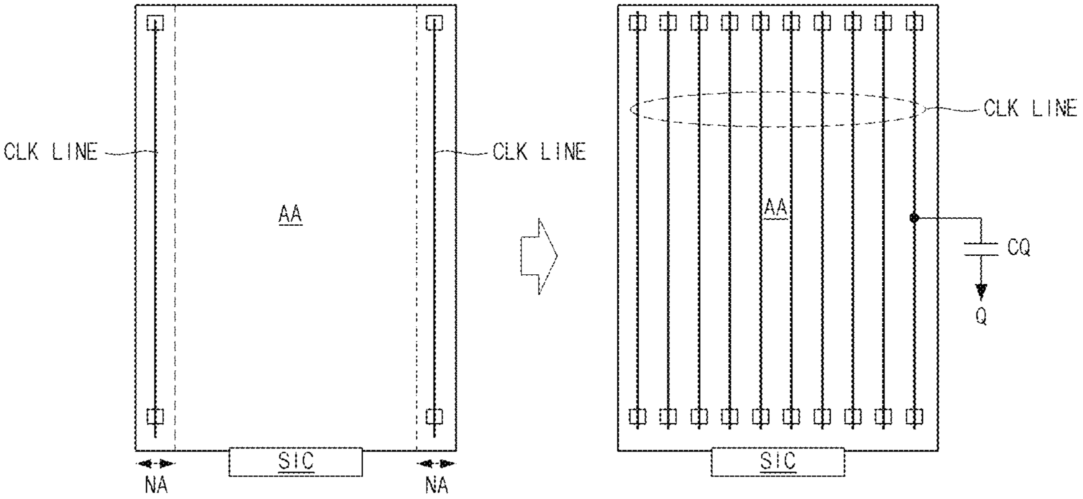
FIG. 8 is a diagram illustrating a comparison of a clock line position based on a gate in panel (GIP) type and a clock line position based on a GIA type.
Figure 9:
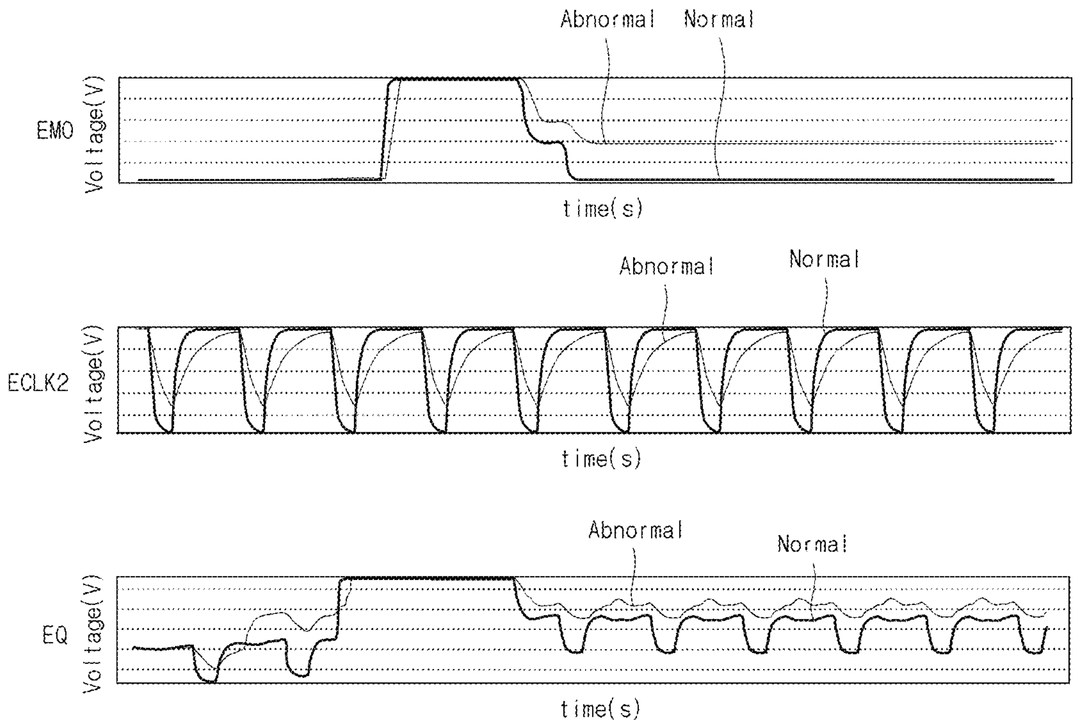
FIG. 9 is a diagram illustrating a case where an output of an emission signal is distorted when an RC delay of an emission clock increases in a GIA type.

FIG. 8 is a diagram illustrating a comparison of a clock line position based on a gate in panel (GIP) type and a clock line position based on a GIA type. FIG. 9 is a diagram illustrating a case where an output of an emission signal is distorted when a resistor-capacitor (RC) delay of an emission clock increases in a GIA type.

According to a conventional GIP type, as in FIG. 8, clock lines for a gate output (for example, a scan signal and an emission signal) may be disposed in a left non-display area NA and a right non-display area NA. Gate driver sets may be disposed in the left non-display area NA and the right non-display area NA.

On the other hand, according to a GIA type of the present disclosure, because gate driver sets are distributed and disposed in a display area, as in FIG. 8, a plurality of clock lines for a gate output may be distributed and disposed in a display area AA.

The GIA type may be relatively far greater in load of a clock signal than the GIP type. Referring to FIGS. 6 and 9, an emission clock ECLK2 may affect the Q node through the CQ capacitor, and thus, when a load of the emission clock ECLK2 increases, an emission output EMO may be distorted.

In detail, when the emission clock ECLK2 is delayed by an increase in load, a voltage of the emission clock ECLK2 may not reach a level capable of turning on the T1 transistor, and thus, a voltage of the Q node QB may increase. Therefore, a coupling effect based on a connection node between the CQ capacitor and the T11 transistor may decrease. As a result, the T6 transistor may not be fully turned on, and due to this, a voltage of the emission output EMO may abnormally increase. To reduce the distortion of the emission output EMO, a method of reducing a delay of an emission clock may be needed.

First Embodiment

Figure 10:
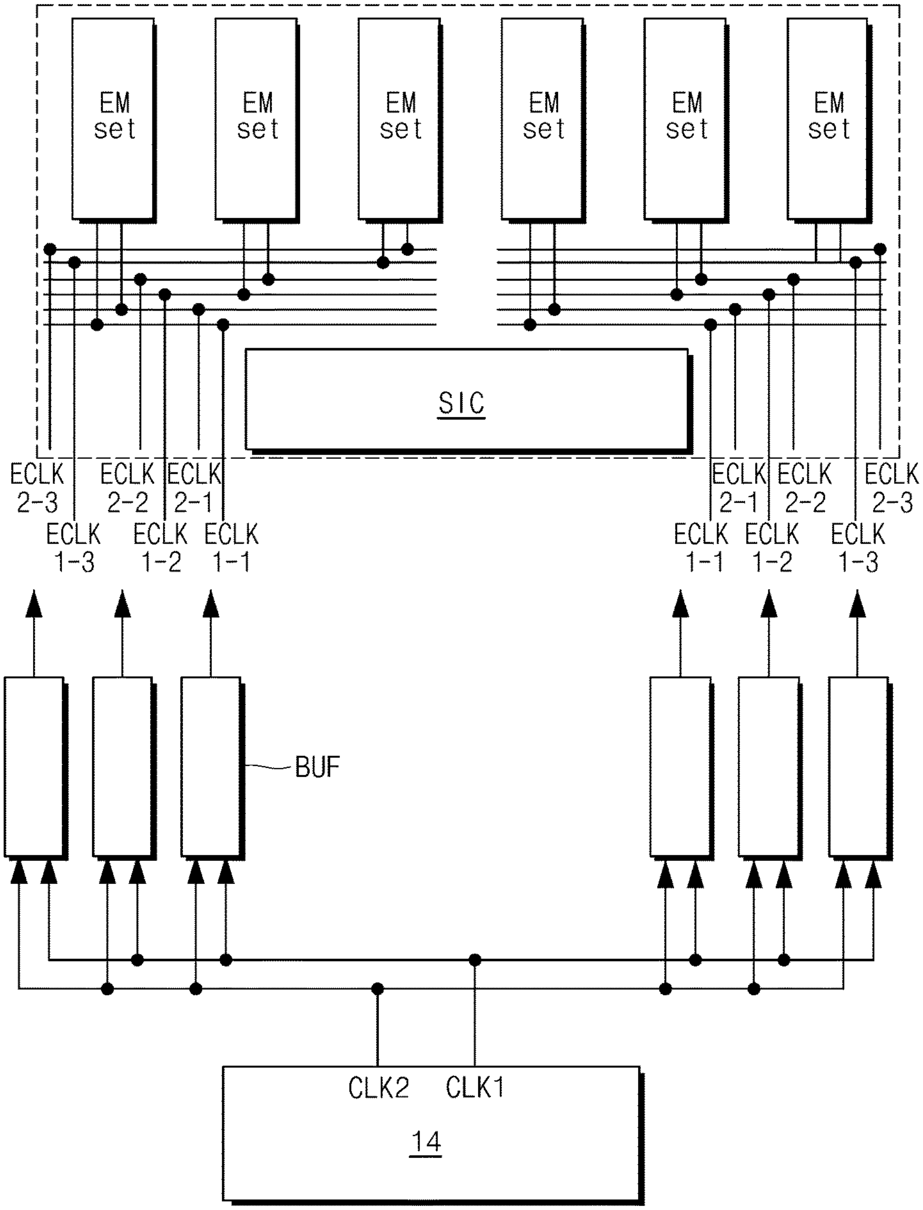
FIGS. 10 and 11 are diagrams for decreasing a delay of an emission clock in a GIA type according to a first embodiment of the present disclosure.
Figure 11:
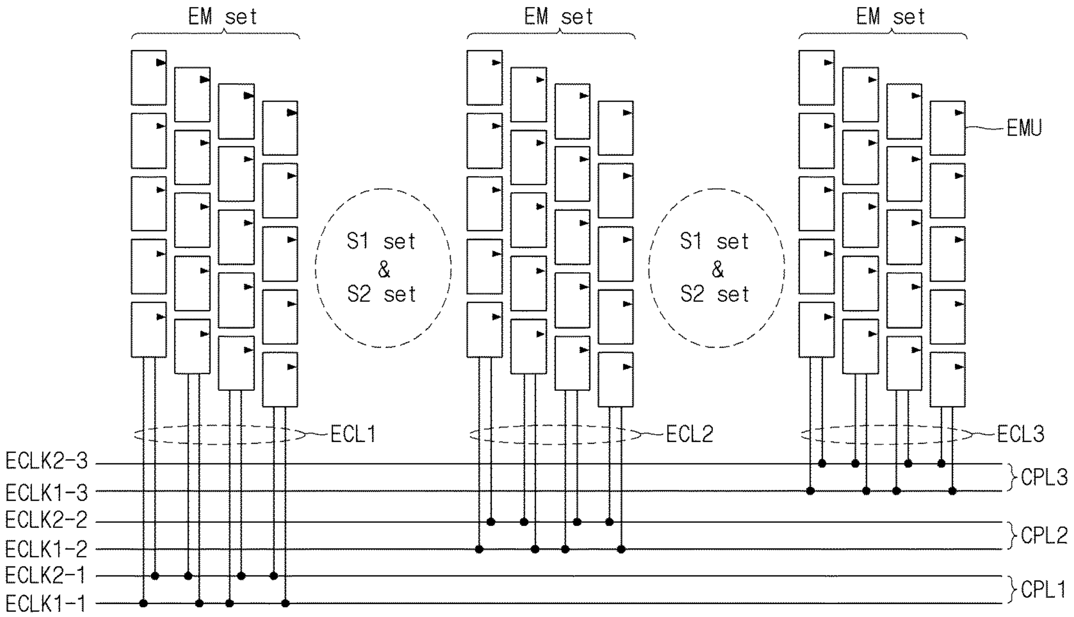

FIGS. 10 and 11 are diagrams for decreasing a delay of an emission clock in a GIA type according to a first embodiment of the present disclosure.

FIGS. 10 and 11 illustrate in detail a connection configuration between EM sets in FIG. 4. In FIGS. 10 and 11, the detailed illustrations of S1 sets and S2 sets are omitted.

Referring to FIGS. 10 and 11, a plurality of EM sets may be disposed apart from each other with S1 and S2 sets therebetween in a display area. The inventive concept is not limited to the number of EM sets. The inventive concept may be applied to two or more EM sets.

In detail, a first EM set may be disposed in a first display area of a display panel and may supply an emission signal, needed for pixel driving, to a plurality of emission signal supply lines. First emission clock lines ECL1 may be connected to the first EM set in the first display area.

A second EM set may be disposed in a second display area of the display panel and may supply the emission signal, needed for pixel driving, to a plurality of emission signal supply lines. Second emission clock lines ECL2 may be connected to the second EM set in the second display area.

A third EM set may be disposed in a third display area of the display panel and may supply the emission signal, needed for pixel driving, to a plurality of emission signal supply lines. Third emission clock lines ECL3 may be connected to the third EM set in the third display area.

To reduce a delay of an emission clock, the emission clock may be separately input to the first EM set, the second EM set, and the third EM set. To this end, the first embodiment may include first division lines CPL1, second division lines CPL2, and third division lines CPL3.

The first division lines CPL1 may supply a first emission clock ECLK1-1 and a second emission clock ECLK2-1 having different phases to the first emission clock lines ECL1.

The second division lines CPL2 may supply a first emission clock ECLK1-2 and a second emission clock ECLK2-2 having different phases to the second emission clock lines ECL2.

The third division lines CPL3 may supply a first emission clock ECLK1-3 and a second emission clock ECLK2-3 having different phases to the third emission clock lines ECL3.

The first emission clocks ECLK1-1, ECLK1-2, and ECLK1-3 may have the same phase. The second emission clocks ECLK2-1, ECLK2-2, and ECLK2-3 may have the same phase. On the other hand, for example, the second emission clocks (ECLK2-1, ECLK2-2, and ECLK2-3) may have different phases from the first emission clocks (ECLK1-1, ECLK1-2, and ECLK1-3).

CLK1 generated by the level shifter 14 may be divided into the first emission clocks ECLK1-1, ECLK1-2, and ECLK1-3 through division buffers BUF. CLK2 generated by the level shifter 14 may be divided into the second emission clocks ECLK2-1, ECLK2-2, and ECLK2-3 through the division buffers BUF. When the division buffers BUF are used, a side effect such as a reduction in signal occurring when dividing a clock may be prevented.

A first division buffer BUF may divide the first emission clock ECLK1-1 and the second emission clock ECLK2-1 to supply to the first division lines CPL1.

A second division buffer BUF may divide the first emission clock ECLK1-2 and the second emission clock ECLK2-2 to supply to the second division lines CPL2.

A third division buffer BUF may divide the first emission clock ECLK1-3 and the second emission clock ECLK2-3 to supply to the third division lines CPL3.

Figure 12:
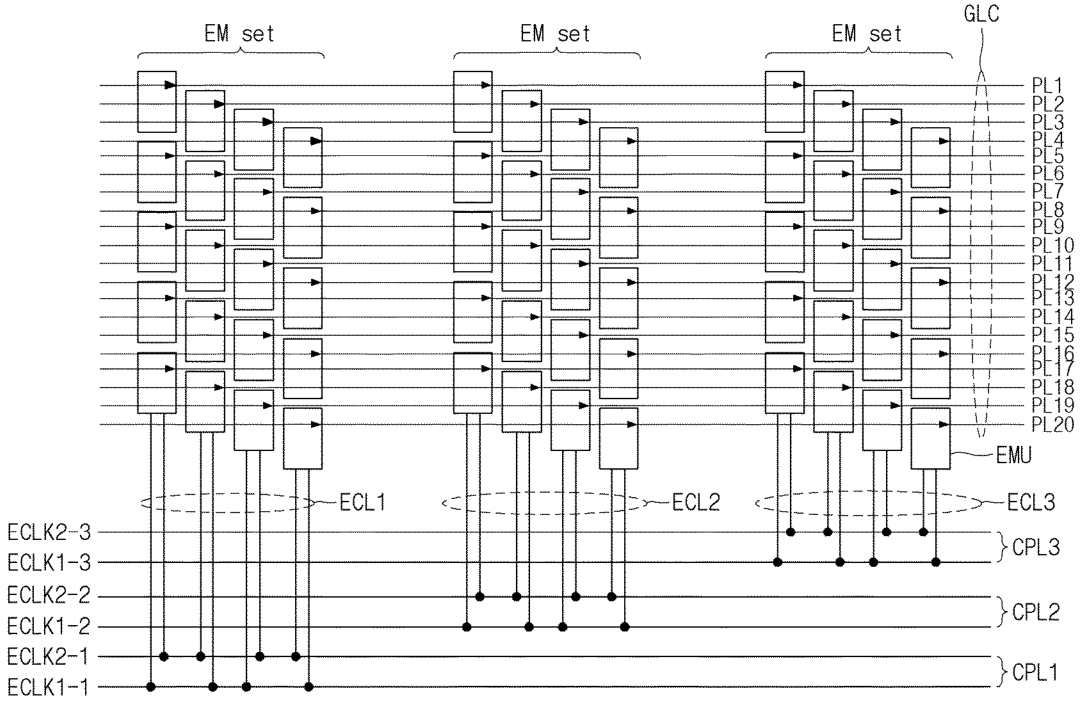
FIG. 12 is a diagram illustrating a case where emission signal supply lines corresponding to the same pixel row among a plurality of emission signal supply lines are connected to each other in first and second display areas according to an embodiment of the present disclosure.
Figure 13:
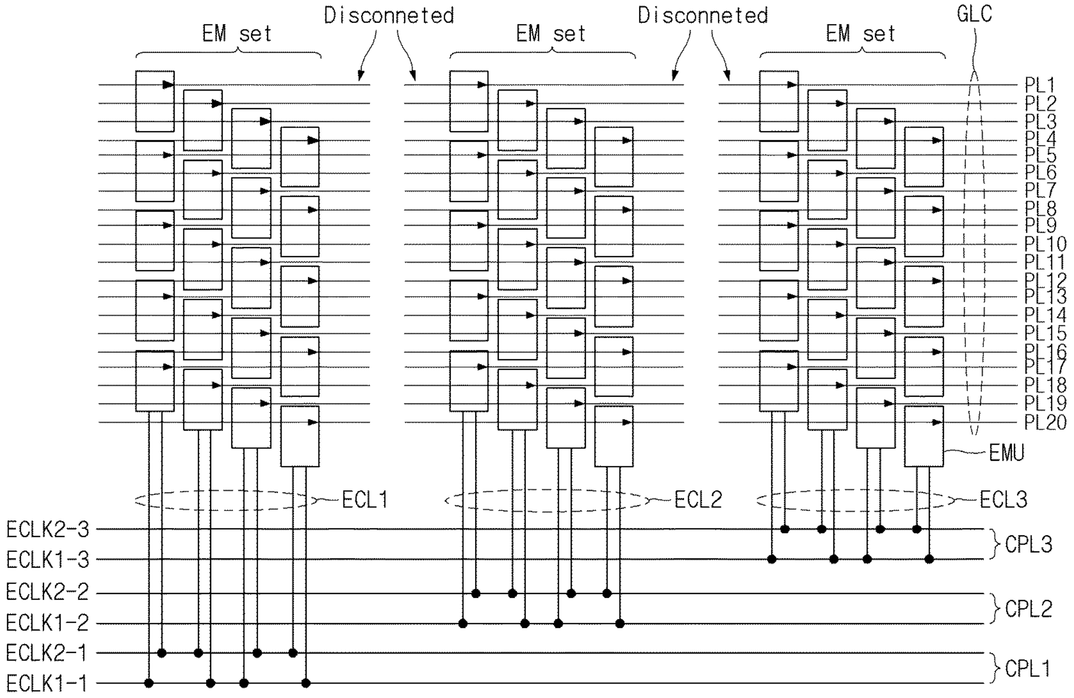
FIG. 13 is a diagram illustrating a case where emission signal supply lines corresponding to the same pixel row among a plurality of emission signal supply lines are separated from each other in first and second display areas according to an embodiment of the present disclosure.

FIGS. 12 and 13 are diagrams illustrating examples where emission signals having the same phase are multiply supplied to emission signal supply lines of the same pixel row.

Referring to FIG. 12, emission signal supply lines GLc corresponding to the same pixel row PL among a plurality of emission signal supply lines GLc may be connected to each other in first, second, and third display areas. First to third EM sets disposed in the first, second, and third display areas may supply emission signals having the same phase to multi positions of each emission signal supply line GLc.

Referring to FIG. 13, emission signal supply lines GLc corresponding to the same pixel row PL among a plurality of emission signal supply lines GLc may be separated from each other in first, second, and third display areas. First to third EM sets disposed in the first, second, and third display areas may respectively supply emission signals having the same phase to emission signal supply lines GLc.

Furthermore, the first to third EM sets disposed in the first, second, and third display areas may respectively supply emission signals having different phases and pulse widths to the emission signal supply lines GLc separated from one another. To this end, a phase and a pulse width of an emission clock should differ for each of the first to third division buffers of FIG. 10. Therefore, a duty of an emission signal supplied to emission signal supply lines GLc of the first display area, a duty of an emission signal supplied to emission signal supply lines GLc of the second display area, and a duty of an emission signal supplied to emission signal supply lines GLc of the third display area may differ.

A duty of an emission signal may define an emission cycle in one frame, and thus, may be associated with luminance. When a duty of an emission signal is controlled for each display area, low consumption power driving may be performed. A duty of an emission signal in a region of interest may be set to be less than a region of non-interest, and thus, when a region of non-interest is relatively darkened, consumption power may be reduced.

Figure 14:
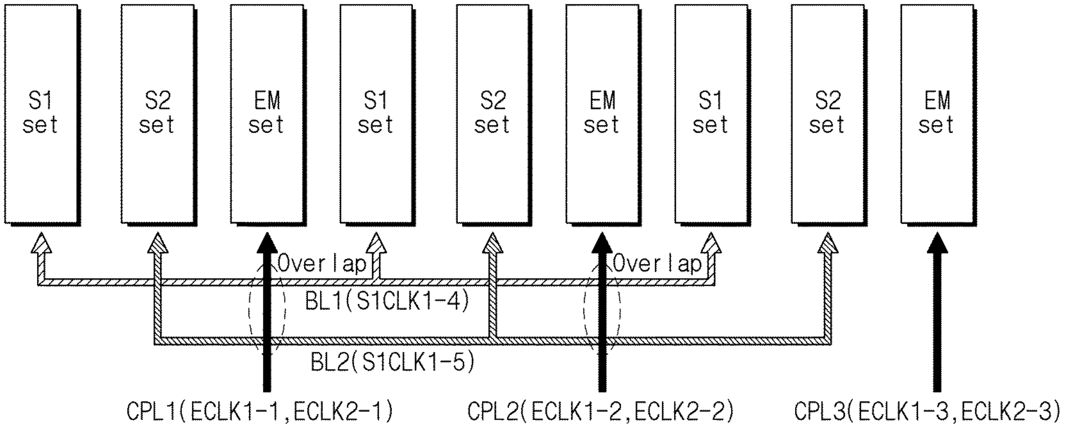
FIG. 14 is a diagram illustrating an example of clock link lines for separately inputting scan clocks and emission clocks to gate driver sets based on a GIA type according to an embodiment of the present disclosure.

FIG. 14 is a diagram illustrating an example of clock link lines for separately inputting scan clocks and emission clocks to gate driver sets based on a GIA type according to an embodiment of the present disclosure.

Referring to FIG. 14, a circuit structure of a first scan unit included in a S1 set and a circuit structure of a second scan unit included in a S2 set may differ from a circuit structure of an emission unit included in an EM set. Scan outputs of the first and second scan units may be less affected by scan clock delay in terms of a circuit structure.

A plurality of S1 sets disposed apart from one another in different display areas may output a first scan signal, needed for pixel driving, to multi positions of each of a plurality of first scan signal supply lines. The plurality of S1 sets may be connected to first scan clock lines in different display areas. The first scan clock lines of the different display areas may be connected to first bus lines BL1 in common and may be supplied with first scan clocks S1CLK1 to S1CLK4 through the first bus lines BL1. Even when common first bus lines BL1 are used, a possibility that an output of the first scan signal is distorted may be low.

A plurality of S2 sets disposed apart from one another in different display areas may output a second scan signal, needed for pixel driving, to multi positions of each of a plurality of second scan signal supply lines. The plurality of S2 sets may be connected to second scan clock lines in different display areas. The second scan clock lines of the different display areas may be connected to second bus lines BL2 in common and may be supplied with second scan clocks S2CLK1 to S2CLK5 through the second bus lines BL2. Even when common second bus lines BL2 are used, a possibility that an output of the second scan signal is distorted may be low.

On the other hand, an emission output of an emission unit may be much affected by emission clock delay in terms of a circuit structure. To decrease a delay of an emission clock, an emission clock may be divided and input to a first EM set, a second EM set, and a third EM set through first division lines CPL1, second division lines CPL2, and third division lines CPL3.

Because the S1, S2, and EM sets are repeatedly arranged in the order thereof, the first and second division lines CPL1 and CPL2 may overlap the first and second bus lines BL1 and BL2 in a non-display area. Due to an overlap between signal lines, an effect of decreasing a delay of an emission clock may be reduced.

Figure 15A:
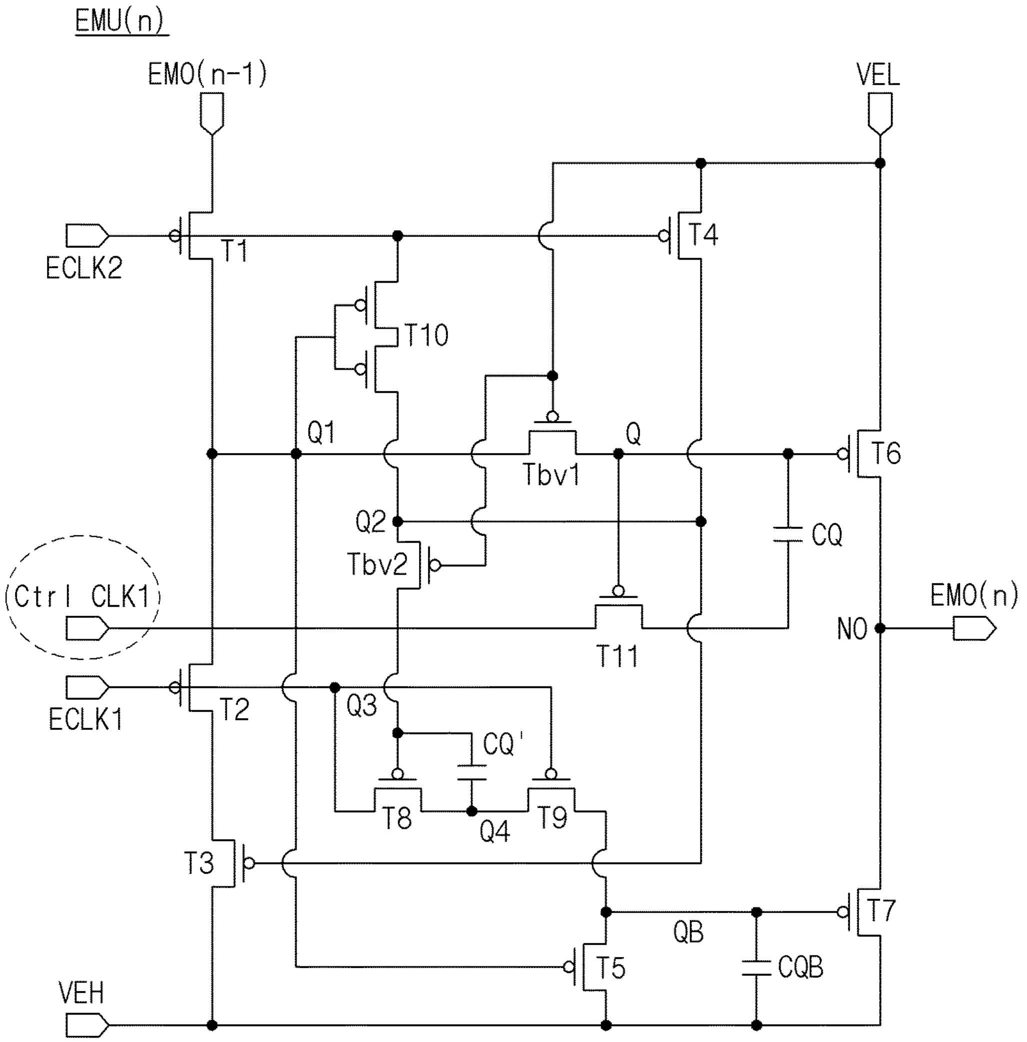
FIGS. 15A and 15B are diagrams illustrating another example of an emission unit circuit included in an emission driver set according to an embodiment of the present disclosure.
Figure 15B:
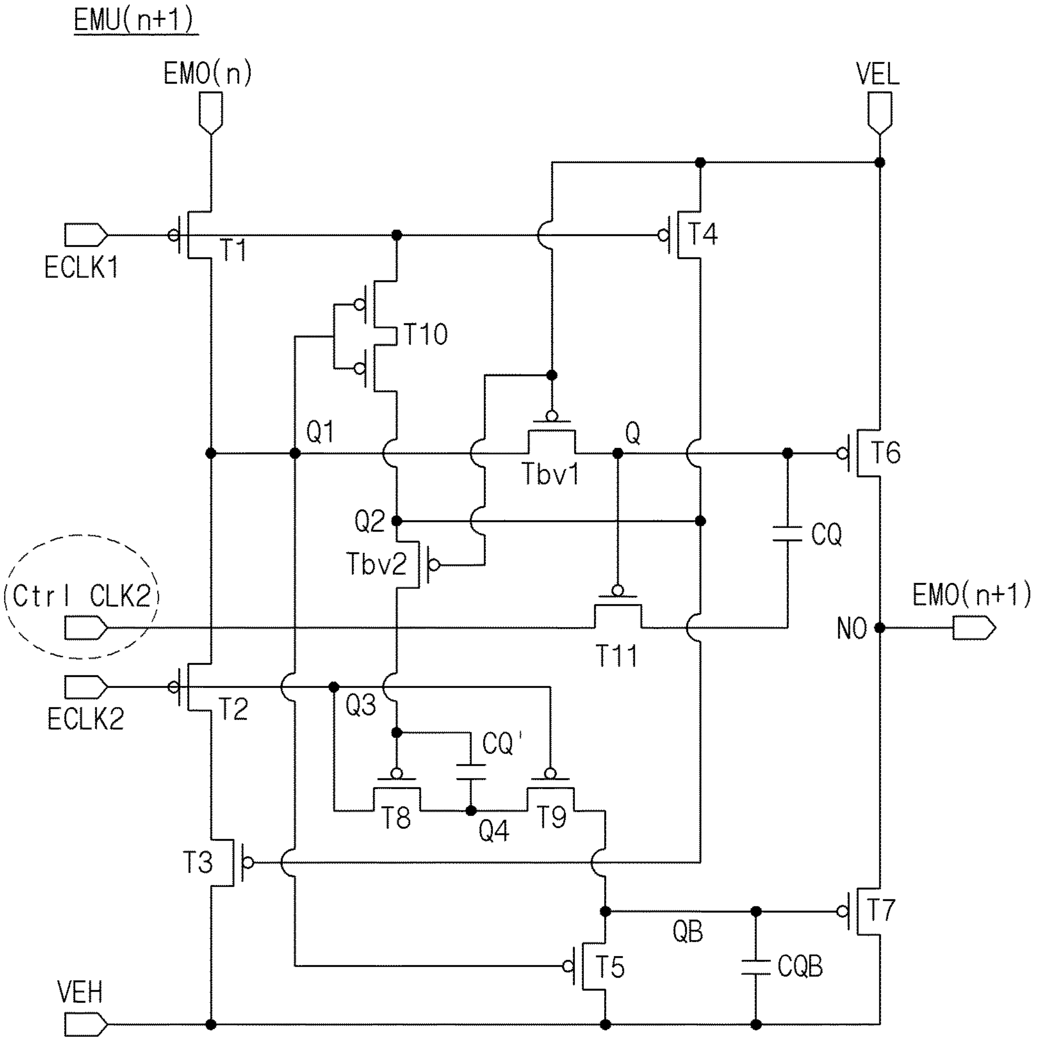
Figure 16:
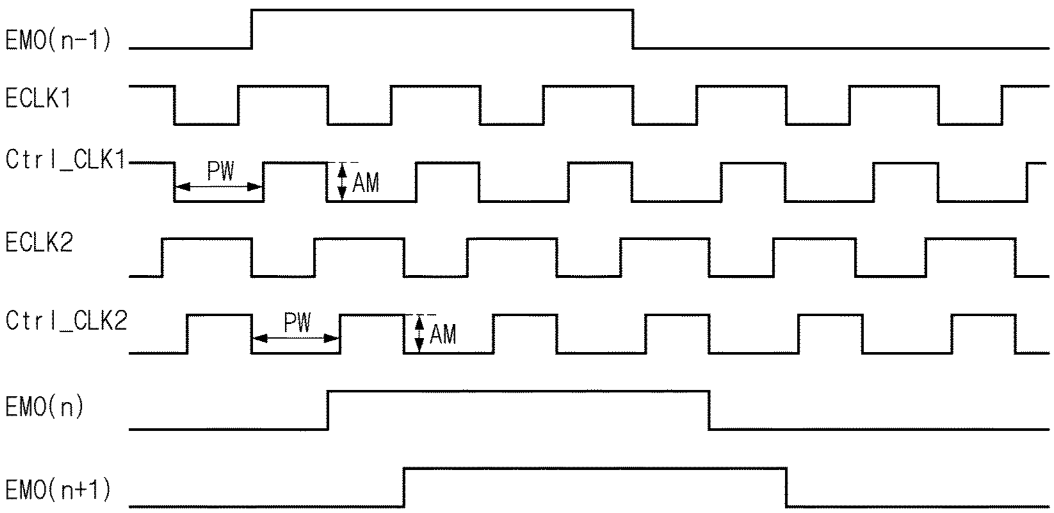
FIG. 16 is a diagram illustrating a driving timing of each of first and second emission clocks and first and second control clocks input to the emission unit circuits of FIGS. 15A and 15B according to an embodiment of the present disclosure.

FIGS. 15A and 15B are diagrams illustrating another example of an emission unit circuit included in an emission driver set according to an embodiment of the present disclosure. FIG. 16 is a diagram illustrating a driving timing of each of first and second emission clocks and first and second control clocks input to the emission unit circuits of FIGS. 15A and 15B.

Referring to FIGS. 15A and 15B, an emission unit EMU may be further supplied with a control clock Ctrl CLK1 or Ctrl CLK2. In the emission unit EMU of FIG. 6, an emission clock ECLK1 may be coupled to a Q node through a T11 transistor and a CQ capacitor, but in the emission unit EMU of FIG. 15A, a first control clock Ctrl CLK1 may be coupled to a Q node through a T11 transistor and a CQ capacitor. Also, in the emission unit EMU of FIG. 15B, a second control clock Ctrl CLK2 may be coupled to a Q node through a T11 transistor and a CQ capacitor.

In the emission units EMU of FIGS. 15A and 15B, because the CQ capacitor is coupled to a separate control clock, the degree to which the emission clock ECLK1 is delayed due to the CQ capacitor may be considerably reduced. The separate control clock may be associated with only a coupling operation of a Q node, and thus, may have an advantage where a pulse width and a pulse amplitude may freely vary in a cycle of a synchronized emission clock.

Referring to FIG. 16, the first control clock Ctrl CLK1 input to the emission unit EMU of FIG. 15A may have the same cycle as the first emission clock ECLK1, and a pulse width PW of the first control clock Ctrl CLK1 may be greater than a pulse width of the first emission clock ECLK1, so as to increase a coupling effect. Also, a pulse amplitude AM of the first control clock Ctrl CLK1 may be greater than a pulse amplitude of the first emission clock ECLK1, so as to increase a coupling effect.

Referring to FIG. 16, the second control clock Ctrl CLK2 input to the emission unit EMU of FIG. 15B may have the same cycle as the second emission clock ECLK2, and a pulse width PW of the second control clock Ctrl CLK2 may be greater than a pulse width of the second emission clock ECLK2, so as to increase a coupling effect. Also, a pulse amplitude AM of the second control clock Ctrl CLK2 may be greater than a pulse amplitude of the second emission clock ECLK2, so as to increase a coupling effect.

Figure 17:
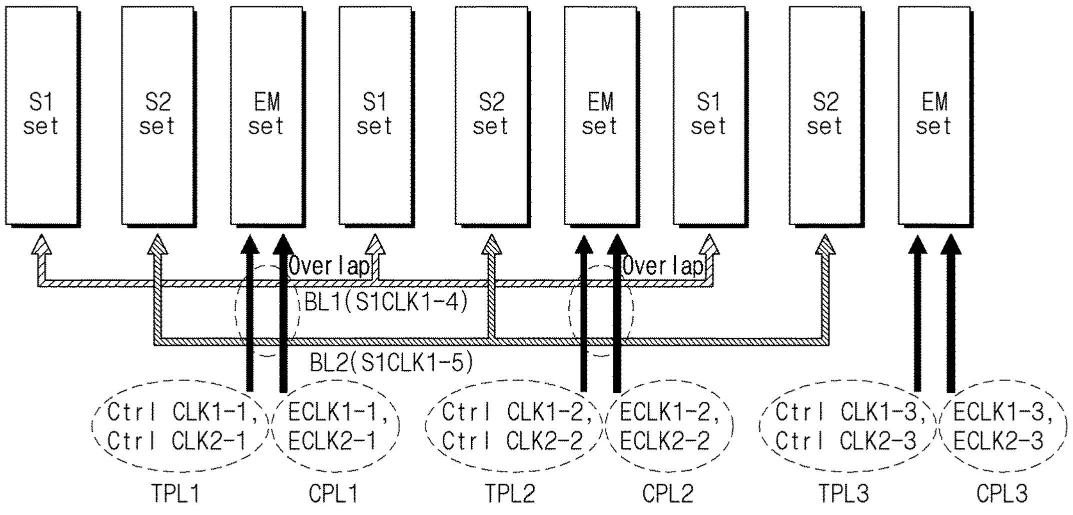
FIG. 17 is a diagram illustrating an example of clock link lines for separately inputting scan clocks, emission clocks, and control clocks to gate driver sets based on a GIA type according to an embodiment of the present disclosure.

FIG. 17 is a diagram illustrating an example of clock link lines for separately inputting scan clocks, emission clocks, and control clocks to gate driver sets based on a GIA type according to an embodiment of the present disclosure.

Referring to FIG. 17, first control clock lines may be further connected to a first EM set in a first display area. First control clock division lines TPL1 may supply a first control clock Ctrl CLK1-1 and a second control clock Ctrl CLK2-1 having different phases to the first control clock lines.

Second control clock lines may be further connected to a second EM set in a second display area. Second control clock division lines TPL2 may supply a first control clock Ctrl CLK1-2 and a second control clock Ctrl CLK2-2 having different phases to the second control clock lines.

Third control clock lines may be further connected to a third EM set in a third display area. Third control clock division lines TPL3 may supply a first control clock Ctrl CLK1-3 and a second control clock Ctrl CLK2-3 having different phases to the third control clock lines.

The first control clocks Ctrl CLK1-1, Ctrl CLK1-2, and Ctrl CLK1-3 may have the same phase, and the second control clocks Ctrl CLK2-1, Ctrl CLK2-2, and Ctrl CLK2-3 may have the same phase. On the other hand, for example, the second control clocks (Ctrl CLK2-1, Ctrl CLK2-2, and Ctrl CLK2-3) may have different phases from the first control clocks (Ctrl CLK1-1, Ctrl CLK1-2, and Ctrl CLK1-3).

Because the S1, S2, and EM sets are repeatedly arranged in the order thereof, the first and second division lines CPL1 and CPL2 and the first and second control clock division lines TPL1 and TPL2 may overlap the first and second bus lines BL1 and BL2 in a non-display area. Due to an overlap between signal lines, an effect of decreasing a delay of an emission clock may be enhanced by adjusting a pulse width and/or a pulse amplitude of a control clock.

Second Embodiment

Figure 18:
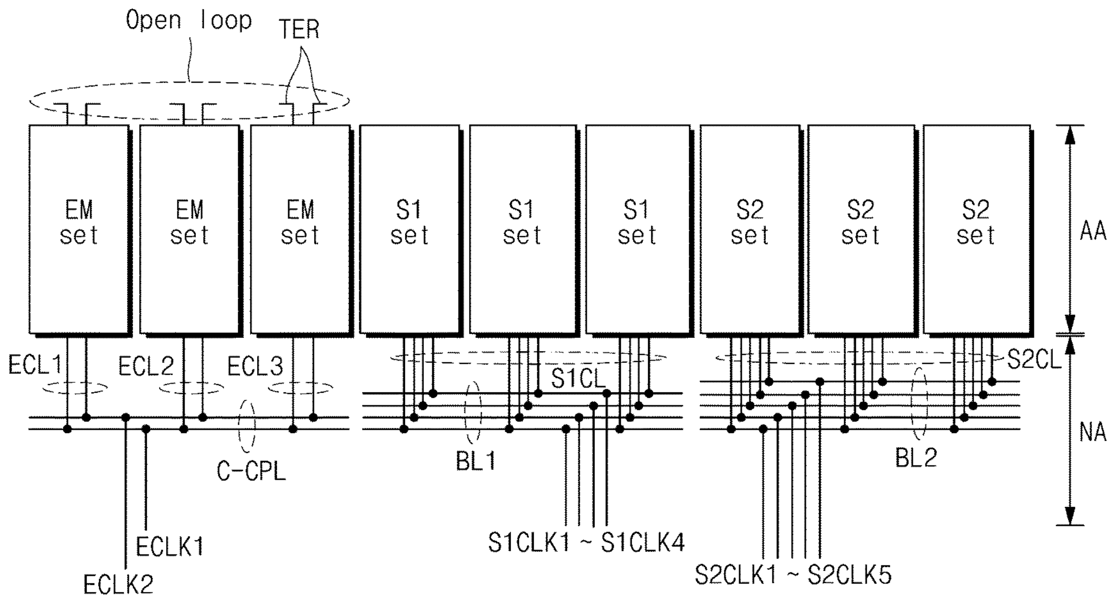
FIGS. 18 and 19 are diagrams illustrating an embodiment for reducing a delay of an emission clock in a GIA type according to a second embodiment of the present disclosure.
Figure 19:
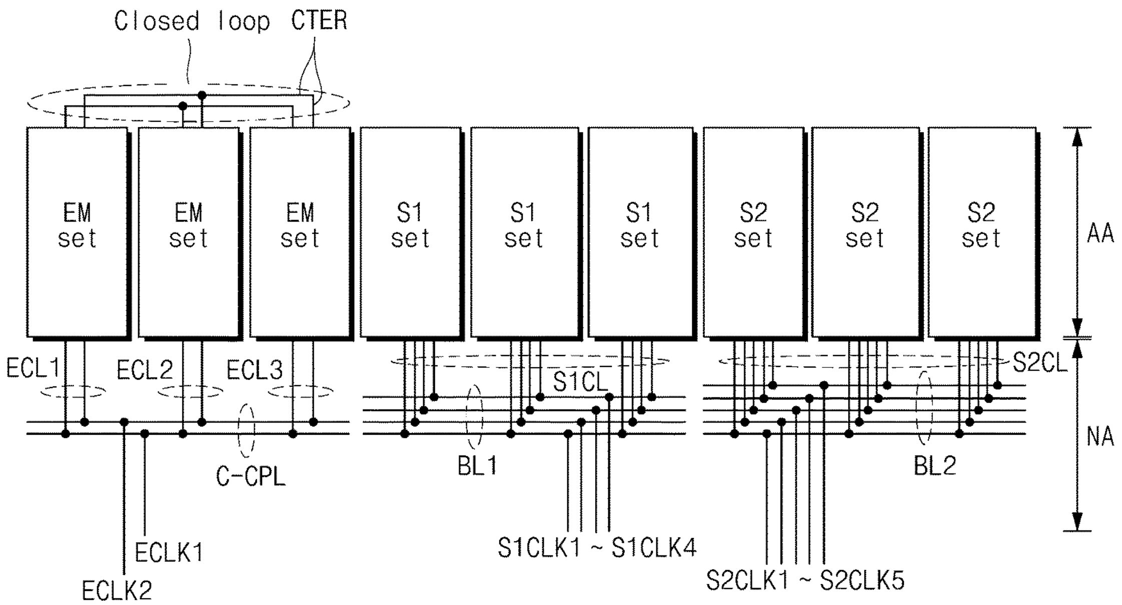

FIGS. 18 and 19 are diagrams for reducing a delay of an emission clock in a GIA type according to a second embodiment of the present disclosure.

Referring to FIGS. 18 and 19, an emission driver group where EM sets are grouped may be disposed in a first display area AA of a display panel, a first scan driver group where S1 sets are grouped may be disposed in a second display area AA adjacent to the first display area AA, and a second scan driver group where S2 sets are grouped may be disposed in a third display area AA adjacent to the second display area AA.

Emission clock link lines C-CPL disposed in a non-display area NA may supply a plurality of emission clocks ECLK1 and ECLK2 to a plurality of emission clock lines ECL1 to ECL3 connected to an emission driver group.

First scan clock bus lines BL1 disposed in the non-display area NA may supply a plurality of first scan clocks S1CLK1 to S1CLK4 to a plurality of first scan clock lines S1CL connected to a first scan driver group.

Second scan clock bus lines BL2 disposed in the non-display area NA may supply a plurality of second scan clocks S2CLK1 to S2CLK5 to a plurality of second scan clock lines S2CL connected to a second scan driver group.

Because the emission clock link lines C-CPL, the first scan clock bus lines BL1, and the second scan clock bus lines BL2 do not overlap each other, a width of a lower bezel corresponding to the non-display area NA may be reduced. Also, because the signal lines do not overlap each other, even when the emission clocks ECLK1 and ECLK2 are supplied to the emission clock lines ECL1 to ECL3 through the emission clock link lines C-CPL in common, a delay of an emission clock may not largely occur.

Referring to FIG. 18, each of terminations TER of emission clock lines ECL1 to ECL3 through which the first emission clock ECLK1 is supplied may be open, and each of terminations TER of emission clock lines ECL1 to ECL3 through which the second emission clock ECLK2 is supplied may be open.

Referring to FIG. 19, the terminations TER of the emission clock lines ECL1 to ECL3 through which the first emission clock ECLK1 is supplied may be connected to each other through a first termination connection portion CTER, and the terminations TER of the emission clock lines ECL1 to ECL3 through which the second emission clock ECLK2 is supplied may be connected to each other through a second termination connection portion CTER.

Comparing with FIG. 18 where terminations configure an open loop, FIG. 19 where terminations configure a closed loop may more effectively decrease a delay of an emission clock. To decrease the degree of an increase in upper bezel caused by the termination connection portion CTER, a line width of the termination connection portion CTER may be less than a line width of each of the emission clock lines ECL1 to ECL3.

Third Embodiment

Figure 20:
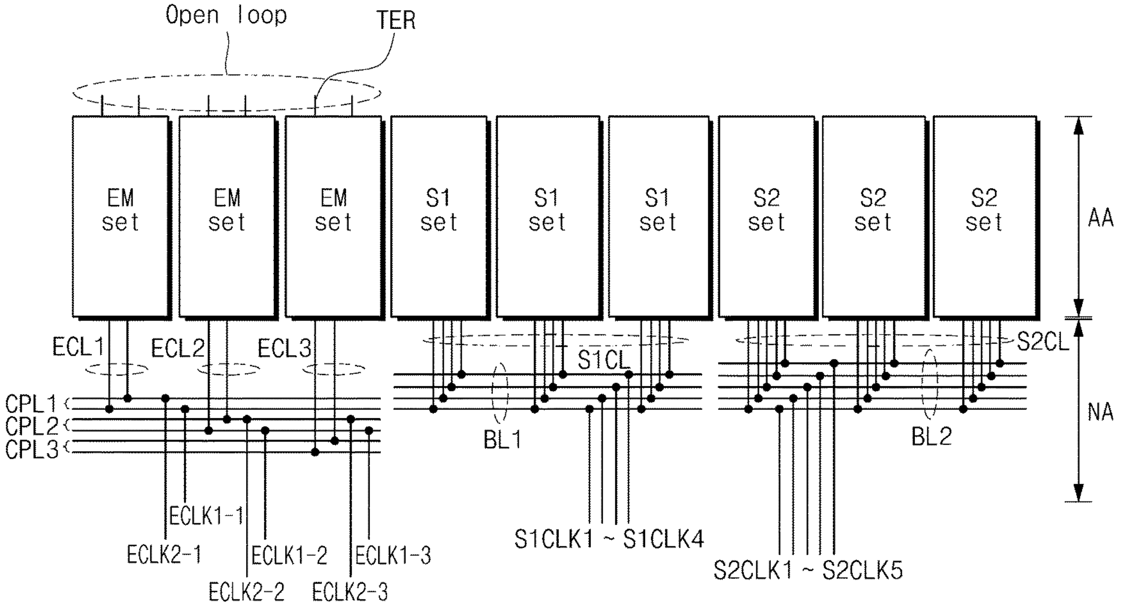
FIGS. 20 and 21 are diagrams illustrating a third embodiment for reducing a delay of an emission clock in a GIA type according to an embodiment of the present disclosure.
Figure 21:
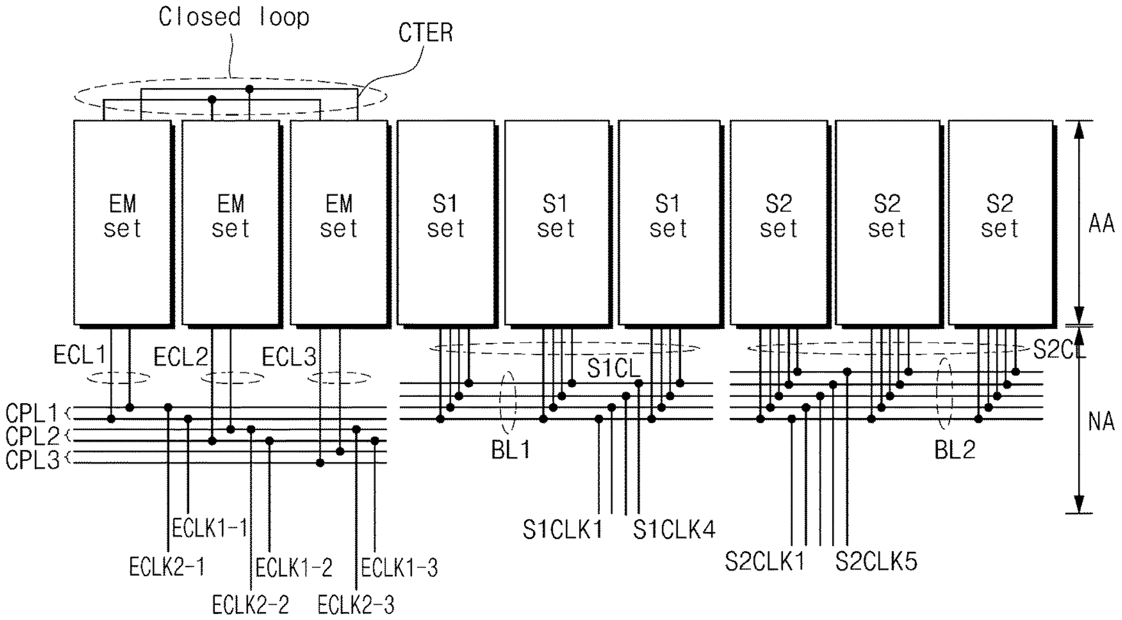

FIGS. 20 and 21 are diagrams for reducing a delay of an emission clock in a GIA type according to a third embodiment of the present disclosure.

Referring to FIGS. 20 and 21, an emission driver group where EM sets are grouped may be disposed in a first display area AA of a display panel, a first scan driver group where S1 sets are grouped may be disposed in a second display area AA adjacent to the first display area AA, and a second scan driver group where S2 sets are grouped may be disposed in a third display area AA adjacent to the second display area AA.

Emission clock link lines CPL1 to CPL3 disposed in a non-display area NA may supply a plurality of emission clocks ECLK1 and ECLK2 to a plurality of emission clock lines ECL1 to ECL3 connected to an emission driver group.

The emission clock link lines CPL1 to CPL3 may include first division lines CPL1 which supply a first emission clock ECLK1-1 and a second emission clock ECLK2-1 to first emission clock lines ECL1 connected to a first EM set, second division lines CPL2 which supply a first emission clock ECLK1-2 and a second emission clock ECLK2-2 to second emission clock lines ECL2 connected to a second EM set, and third division lines CPL3 which supply a first emission clock ECLK1-3 and a second emission clock ECLK2-3 to third emission clock lines ECL3 connected to a third EM set.

The first emission clocks ECLK1-1, ECLK1-2, and ECLK1-3 may have the same phase. The second emission clocks ECLK2-1, ECLK2-2, and ECLK2-3 may have the same phase.

As in FIG. 10, CLK1 generated by the level shifter 14 may be divided into the first emission clocks ECLK1-1, ECLK1-2, and ECLK1-3 through division buffers BUF. CLK2 generated by the level shifter 14 may be divided into the second emission clocks ECLK2-1, ECLK2-2, and ECLK2-3 through the division buffers BUF. When the division buffers BUF are used, a side effect such as a reduction in signal occurring when dividing a clock may be prevented.

A first division buffer BUF may divide the first emission clock ECLK1-1 and the second emission clock ECLK2-1 to supply to the first division lines CPL1.

A second division buffer BUF may divide the first emission clock ECLK1-2 and the second emission clock ECLK2-2 to supply to the second division lines CPL2.

A third division buffer BUF may divide the first emission clock ECLK1-3 and the second emission clock ECLK2-3 to supply to the third division lines CPL3.

First scan clock bus lines BL1 disposed in the non-display area NA may supply a plurality of first scan clocks S1CLK1 to S1CLK4 to a plurality of first scan clock lines S1CL connected to a first scan driver group.

Second scan clock bus lines BL2 disposed in the non-display area NA may supply a plurality of second scan clocks S2CLK1 to S2CLK5 to a plurality of second scan clock lines S2CL connected to a second scan driver group.

Because the emission clock link lines CPL1 to CPL3, the first scan clock bus lines BL1, and the second scan clock bus lines BL2 do not overlap each other, a width of a lower bezel corresponding to the non-display area NA may be reduced. Also, because the signal lines do not overlap each other, and the emission clocks are divided and supplied to the emission clock lines ECL1 to ECL3 through the emission clock link lines CPL1 to CPL3, a delay of an emission clock may be considerably reduced.

Referring to FIG. 20, each of terminations TER of emission clock lines ECL1 to ECL3 through which the first emission clock ECLK1 is supplied may be open, and each of terminations TER of emission clock lines ECL1 to ECL3 through which the second emission clock ECLK2 is supplied may be open.

Referring to FIG. 21, the terminations of the emission clock lines ECL1 to ECL3 through which the first emission clock ECLK1 is supplied may be connected to each other through a first termination connection portion CTER, and the terminations of the emission clock lines ECL1 to ECL3 through which the second emission clock ECLK2 is supplied may be connected to each other through a second termination connection portion CTER.

Comparing with FIG. 20 where terminations configure an open loop, FIG. 21 where terminations configure a closed loop may more effectively decrease a delay of an emission clock. To decrease the degree of an increase in upper bezel caused by the termination connection portion CTER, a line width of the termination connection portion CTER may be less than a line width of each of the emission clock lines ECL1 to ECL3.

Fourth Embodiment

Figure 22:
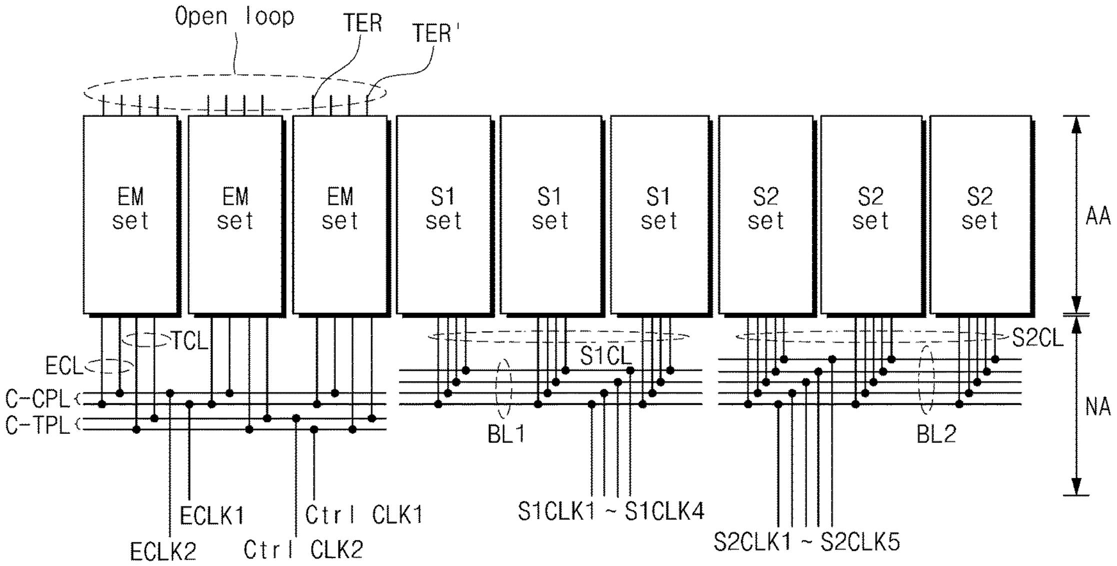
FIGS. 22 and 23 are diagrams illustrating a fourth embodiment for reducing a delay of an emission clock in a GIA type according to an embodiment of the present disclosure.
Figure 23:
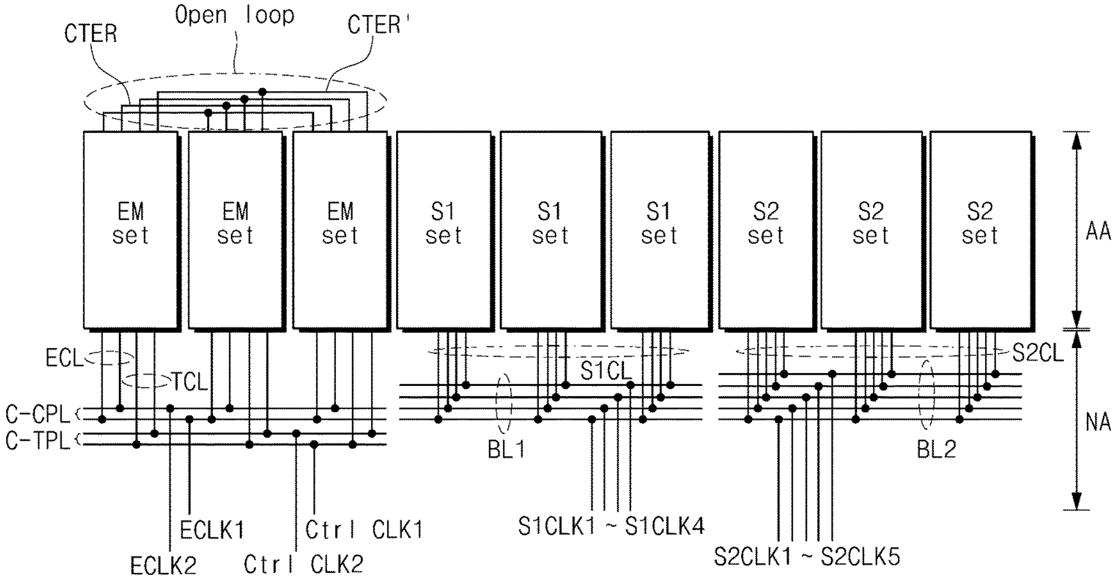

FIGS. 22 and 23 are diagrams for reducing a delay of an emission clock in a GIA type according to a fourth embodiment of the present disclosure.

Referring to FIGS. 22 and 23, an emission driver group where EM sets are grouped may be disposed in a first display area AA of a display panel, a first scan driver group where S1 sets are grouped may be disposed in a second display area AA adjacent to the first display area AA, and a second scan driver group where S2 sets are grouped may be disposed in a third display area AA adjacent to the second display area AA.

Emission clock link lines CPL1 to CPL3 disposed in a non-display area NA may supply a plurality of emission clocks ECLK1 and ECLK2 to a plurality of emission clock lines ECL connected to an emission driver group.

Control clock link lines C-TPL disposed in the non-display area NA may supply a plurality of control clocks Ctrl CLK1 and Ctrl CLK2 to a plurality of control clock lines PCL connected to the emission driver group.

The control clocks Ctrl CLK1 and Ctrl CLK2 may have the same cycle as the emission clocks ECLK1 and ECLK2 and may be greater in one or more of pulse width and pulse amplitude than the emission clocks ECLK1 and ECLK2.

First scan clock bus lines BL1 disposed in the non-display area NA may supply a plurality of first scan clocks S1CLK1 to S1CLK4 to a plurality of first scan clock lines S1CL connected to a first scan driver group.

Second scan clock bus lines BL2 disposed in the non-display area NA may supply a plurality of second scan clocks S2CLK1 to S2CLK5 to a plurality of second scan clock lines S2CL connected to a second scan driver group.

Because the emission clock link lines C-CPL or the control clock link lines C-TPL and the first scan clock bus lines BL1 and the second scan clock bus lines BL2 do not overlap each other, a width of a lower bezel corresponding to the non-display area NA may be reduced. Also, because the signal lines do not overlap each other and the control clocks Ctrl CLK1 and Ctrl CLK2 are further supplied, even when the emission clocks ECLK1 and ECLK2 are supplied to the emission clock lines ECL1 to ECL3 through the emission clock link lines C-CPL in common, a delay of an emission clock may not largely occur.

Referring to FIG. 22, each of terminations TER of emission clock lines ECL through which the first emission clock ECLK1 is supplied may be open, and each of terminations TER of emission clock lines ECL through which the second emission clock ECLK2 is supplied may be open. Also, each of terminations TER' of control clock lines TCL through which the first control clock Ctrl CLK1 is supplied may be open, and each of terminations TER' of control clock lines TCL through which the second control clock Ctrl CLK2 is supplied may be open.

Referring to FIG. 23, the terminations of the emission clock lines ECL through which the first emission clock ECLK1 is supplied may be connected to each other through a first termination connection portion CTER, and the terminations of the emission clock lines ECL1 to ECL3 through which the second emission clock ECLK2 is supplied may be connected to each other through a second termination connection portion CTER. Also, terminations of control clock lines TCL through which the first control clock Ctrl CLK1 is supplied may be connected to each other through a third termination connection portion CTER', and terminations of control clock lines TCL through which the second control clock Ctrl CLK2 is supplied may be connected to each other through a fourth termination connection portion CTER'.

Compared with FIG. 22 where terminations configure an open loop, FIG. 23 where terminations configure a closed loop may more effectively decrease a delay of an emission clock. To decrease the degree of an increase in upper bezel caused by the termination connection portions CTER and CTER', a line width of each of the termination connection portions CTER and CTER' may be less than a line width of each of the emission clock lines ECL and a line width of each of the control clock lines TCL.

The display apparatus according to the embodiments of the present disclosure may decrease a delay of an emission clock and may thus reduce the distortion of a gate output occurring in gate driver sets distributed and disposed in a display area.

The effects according to the present disclosure are not limited to the above examples, and other various effects may be included in the specification.

While the present disclosure has been particularly shown and described with reference to exemplary embodiments thereof, it will be understood by those of ordinary skill in the art that various changes in form and details may be made therein without departing from the spirit and scope of the present disclosure as defined by the following claims.

What is claimed is:

1. A display apparatus comprising:

a first emission driver set in a first display area of a display panel, the first emission driver set configured to output an emission signal needed for pixel driving to a plurality of emission signal supply lines;

a second emission driver set in a second display area of the display panel, the second emission driver set configured to output the emission signal to a plurality of emission signal supply lines, the first display area and the second display area being spaced apart from each other with a third display area and a fourth display area therebetween;

a plurality of first emission clock lines connected to the first emission driver set in the first display area;

a plurality of second emission clock lines connected to the second emission driver set in the second display area;

a plurality of first division lines configured to supply a first emission clock and a second emission clock to the plurality of first emission clock lines, the first emission clock and the second emission clock having different phases; and a plurality of second division lines configured to supply the first emission clock and the second emission clock to the plurality of second emission clock lines;

a first scan driver set in the third display area, the first scan driver set configured to output a first scan signal needed for pixel driving to a plurality of first scan signal supply lines; and a second scan driver set in the fourth display area, the second scan driver set configured to output a second scan signal to a plurality of second scan signal supply lines, the second scan signal having a phase differing from a phase of the first scan signal and is needed for pixel driving.

2. The display apparatus of claim 1, further comprising:

a level shifter configured to generate the first emission clock and the second emission clock;

a first division buffer configured to divide the first emission clock and the second emission clock to supply to the plurality of first division lines; and a second division buffer configured to divide the first emission clock and the second emission clock to supply to the plurality of second division lines.

3. The display apparatus of claim 1, wherein among the plurality of emission signal supply lines in the first display area and the plurality of emission signal supply lines in the second display area, emission signal supply lines corresponding to a same pixel row are connected to each other.

4. The display apparatus of claim 1, wherein among the plurality of emission signal supply lines in the first display area and the plurality of emission signal supply lines in the second display area, emission signal supply lines corresponding to a same pixel row are separated from each other, and wherein a duty of an emission signal supplied to the plurality of emission signal supply lines in the first display area differs from a duty of an emission signal supplied to the plurality of emission signal supply lines disposed in the second display area.

5. The display apparatus of claim 1, further comprising:

a plurality of first control clock lines connected to the first emission driver set in the first display area;

a plurality of second control clock lines connected to the second emission driver set in the second display area;

a plurality of first control clock division lines configured to supply a first control clock and a second control clock to the plurality of first control clock lines, the first control clock and the second control clock having different phases; and a plurality of second control clock division lines configured to supply the first control clock and the second control clock to the plurality of second control clock lines.

6. The display apparatus of claim 5, wherein the first control clock has a same cycle as the first emission clock, the second control clock has a same cycle as the second emission clock, a pulse width of the first control clock is greater than a pulse width of the first emission clock, and a pulse width of the second control clock is greater than a pulse width of the second emission clock.

7. The display apparatus of claim 6, wherein a pulse amplitude of the first control clock is greater than a pulse amplitude of the first emission clock and a pulse amplitude of the second control clock is greater than a pulse amplitude of the second emission clock.

8. The display apparatus of claim 1, further comprising:

a plurality of first bus lines configured to supply a plurality of first scan clocks having different phases to a plurality of first scan clock lines, the plurality of first scan clock lines connected to the first scan driver set; and a plurality of second bus lines configured to supply a plurality of second scan clocks having different phases to a plurality of second scan clock lines, the plurality of second scan clock lines connected to the second scan driver set.

9. A display apparatus comprising:

an emission driver group in a first display area of a display panel, the emission driver group configured to output an emission signal needed for pixel driving to a plurality of emission signal supply lines;

a first scan driver group in a second display area adjacent to the first display area in the display panel, the first scan driver group configured to output a first scan signal needed for pixel driving to a plurality of first scan signal supply lines, the first display area and the second display area being spaced apart from each other with a third display area and a fourth display area therebetween;

a second scan driver group in a third display area adjacent to the second display area in the display panel, the second scan driver group configured to output a second scan signal needed for pixel driving to a plurality of second scan signal supply lines;

a plurality of emission clock link lines configured to supply a plurality of emission clocks to a plurality of emission clock lines, the plurality of emission clock lines connected to the emission driver group;

a plurality of first scan clock bus lines configured to supply a plurality of first scan clocks to a plurality of first scan clock lines, the plurality of first scan clock lines connected to the first scan driver group; and a plurality of second scan clock bus lines configured to supply a plurality of second scan clocks to a plurality of second scan clock lines, the plurality of second scan clock lines connected to the second scan driver group;

a first scan driver set in the third display area, the first scan driver set configured to output a first scan signal needed for pixel driving to a plurality of first scan signal supply lines; and a second scan driver set in the fourth display area, the second scan driver set configured to output a second scan signal to a plurality of second scan signal supply lines, the second scan signal having a phase differing from a phase of the first scan signal and is needed for pixel driving, wherein the plurality of emission clock link lines, the plurality of first scan clock bus lines, and the plurality of second scan clock bus lines are non-overlapping with each other.

10. The display apparatus of claim 9, wherein among the plurality of emission clock lines, each of terminations of emission clock lines through which a first emission clock is supplied is open, and each of terminations of emission clock lines through which a second emission clock having a phase differing from a phase of the first emission clock is supplied is open.

11. The display apparatus of claim 9, wherein among the plurality of emission clock lines, terminations of emission clock lines through which a first emission clock is supplied are connected to each other through a first termination connection portion, terminations of emission clock lines through which a second emission clock having a phase differing from a phase of the first emission clock is supplied are connected to each other through a second termination connection portion, and a line width of each of the first termination connection portion and the second termination connection portion is less than a line width of each of the emission clock lines.

12. The display apparatus of claim 10, wherein the emission driver group comprises a first emission driver set and a second emission driver set, and the plurality of emission clock link lines comprises:

a plurality of first division lines configured to supply the first emission clock and the second emission clock to first emission clock lines, the first emission clock lines connected to the first emission driver set among the plurality of emission clock lines; and a plurality of second division lines configured to supply the first emission clock and the second emission clock to second emission clock lines, the second emission clock lines connected to the second emission driver set among the plurality of emission clock lines.

13. The display apparatus of claim 12, further comprising:

a level shifter configured to generate the first emission clock and the second emission clock;

a first division buffer configured to divide the first emission clock and the second emission clock to supply to the plurality of first division lines; and a second division buffer configured to divide the first emission clock and the second emission clock to supply to the plurality of second division lines.

14. The display apparatus of claim 10, further comprising:

a plurality of control clock link lines configured to supply a plurality of control clocks to a plurality of control clock lines, the plurality of control clock lines connected to the emission driver group, wherein the plurality of control clocks have a same cycle as a cycle of each of the plurality of emission clocks and are greater in one or more of pulse width and pulse amplitude than the plurality of emission clocks.

15. The display apparatus of claim 14, wherein terminations of the plurality of control clock lines through which the plurality of control clocks are supplied are either in an open state of being each open or in a connected state of being connected to each other, said open state or connected state being consistent with a state of the terminations of emission clock lines through which the first emission clock or the second emission clock is supplied.

16. The display apparatus of claim 14, wherein the plurality of control clock link lines, the plurality of first scan clock bus lines, and the plurality of second scan clock bus lines are non-overlapping with each other.

* * * * *